(12) United States Patent
Desineni et al.

(10) Patent No.: US 10,585,677 B2
(45) Date of Patent: Mar. 10, 2020

(54) SYSTEM AND METHOD FOR IDENTIFYING, INDEXING, AND NAVIGATING TO DEEP STATES OF MOBILE APPLICATIONS

(71) Applicant: Samsung Electronics Co., Ltd., Suwon-si, Gyeonggi-do (KR)

(72) Inventors: Kalyan Desineni, Mountain View, CA (US); Matan Levi, Mountain View, CA (US); Moshe Krush, Tel Aviv-Jaffa (IL); Danny Tsechansky, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/875,753

(22) Filed: Jan. 19, 2018

(65) Prior Publication Data

US 2018/0143844 A1 May 24, 2018

Related U.S. Application Data

(63) Continuation of application No. 15/236,140, filed on Aug. 12, 2016, now Pat. No. 9,910,685.

(Continued)

(51) Int. Cl.
*G06F 9/44* (2018.01)
*G06F 9/445* (2018.01)
(Continued)

(52) U.S. Cl.
CPC .......... *G06F 9/44521* (2013.01); *G06F 8/433* (2013.01); *G06F 8/61* (2013.01);
(Continued)

(58) Field of Classification Search
CPC ....................................................... G06F 9/44
See application file for complete search history.

(56) References Cited

U.S. PATENT DOCUMENTS

| 4,833,604 A | 5/1989 | Cheng et al. |
| 6,405,362 B1 | 6/2002 | Shih et al. |

(Continued)

FOREIGN PATENT DOCUMENTS

| EP | 2 721 519 | 12/2012 |
| EP | 2 728 474 A1 | 5/2014 |

(Continued)

OTHER PUBLICATIONS

European Search Report dated Sep. 17, 2018; European Appln. No. 16834755.7-1224/3335408.

(Continued)

*Primary Examiner* — Jae U Jeon
(74) *Attorney, Agent, or Firm* — Jefferson IP Law, LLP

(57) ABSTRACT

A mobile application development system includes a developer portal that receives an application from a developer and provides a routing library to the developer to augment the application. An offline analysis system analyzes the application to (i) determine a set of activities that a handler within the application is programmed to resume in response to respective resumption requests from a host operating system and (ii) determine parameters for each of the activities. The offline analysis system generates a set of links that each corresponds to a respective one of the activities. The routing library, installed as part of the augmented application onto a user device, receives a link, from the user device's operating system, that identifies a first activity. The routing library includes instructions for generating a first resumption request based on parameters corresponding to the first activity and transmitting the first resumption request to the augmented application's handler.

20 Claims, 14 Drawing Sheets

Related U.S. Application Data

(60) Provisional application No. 62/274,152, filed on Dec. 31, 2015, provisional application No. 62/252,357, filed on Nov. 6, 2015, provisional application No. 62/204,960, filed on Aug. 13, 2015.

(51) Int. Cl.
  *G06F 8/61* (2018.01)
  *G06F 8/41* (2018.01)
  *G06F 9/54* (2006.01)
  *G06F 9/451* (2018.01)

(52) U.S. Cl.
  CPC .............. *G06F 9/451* (2018.02); *G06F 9/54* (2013.01); *G06F 9/542* (2013.01)

(56) References Cited

U.S. PATENT DOCUMENTS

| | | |
|---|---|---|
| 6,996,798 B2 | 2/2006 | Ali et al. |
| 7,437,358 B2 | 10/2008 | Arrouye et al. |
| 7,721,219 B2 | 5/2010 | Harsh et al. |
| 7,756,890 B2 | 7/2010 | Carter |
| 7,870,499 B2 | 1/2011 | Latzina et al. |
| 7,873,353 B2 | 1/2011 | Kloba et al. |
| 8,326,858 B2 | 12/2012 | Jenson et al. |
| 8,489,591 B2 | 7/2013 | Wolosin et al. |
| 8,762,360 B2 | 6/2014 | Jiang et al. |
| 8,966,407 B2 | 2/2015 | Shacham et al. |
| 9,055,343 B1 | 6/2015 | Lewis et al. |
| 9,146,972 B2 | 9/2015 | Chang et al. |
| 9,256,697 B2 | 2/2016 | Jiang et al. |
| 9,336,525 B2 | 5/2016 | Singh et al. |
| 9,424,006 B2 | 8/2016 | Abadi et al. |
| 9,438,956 B2 | 9/2016 | Miller et al. |
| 9,538,319 B1 | 1/2017 | Gigliotti et al. |
| 2002/0002637 A1 | 1/2002 | Takeda et al. |
| 2002/0052916 A1 | 5/2002 | Kloba et al. |
| 2002/0059425 A1 | 5/2002 | Belfiore et al. |
| 2002/0194399 A1 | 12/2002 | Asakura |
| 2003/0079215 A1 | 4/2003 | Hundt et al. |
| 2003/0088865 A1 | 5/2003 | Lim et al. |
| 2005/0034121 A1 | 2/2005 | Fisher et al. |
| 2005/0070259 A1 | 3/2005 | Kloba et al. |
| 2005/0228775 A1 | 10/2005 | Nilsen et al. |
| 2007/0067373 A1 | 3/2007 | Higgins et al. |
| 2007/0089055 A1* | 4/2007 | Ko .................... H04L 12/2803 715/700 |
| 2007/0180380 A1 | 8/2007 | Khavari et al. |
| 2008/0200161 A1 | 8/2008 | Morse et al. |
| 2008/0214157 A1 | 9/2008 | Ramer et al. |
| 2008/0222160 A1 | 9/2008 | Macdonald et al. |
| 2010/0169899 A1* | 7/2010 | Faulhaber ............ G06F 13/385 719/326 |
| 2011/0066972 A1 | 3/2011 | Sugiura |
| 2011/0151979 A1 | 6/2011 | Boesen et al. |
| 2011/0154287 A1 | 6/2011 | Mukkamala et al. |
| 2011/0225569 A1 | 9/2011 | Beaty et al. |
| 2011/0307897 A1 | 12/2011 | Atterbury et al. |
| 2012/0011167 A1 | 1/2012 | Schmidt |
| 2012/0096366 A1 | 4/2012 | Narla et al. |
| 2012/0124061 A1 | 5/2012 | Macbeth et al. |
| 2012/0130801 A1 | 5/2012 | Baranov et al. |
| 2012/0143879 A1* | 6/2012 | Stoitsev ............ G06F 16/24575 707/749 |
| 2012/0323898 A1* | 12/2012 | Kumar .............. G06F 16/24578 707/723 |
| 2013/0067494 A1* | 3/2013 | Srour .................... G06F 9/485 719/318 |
| 2013/0110815 A1 | 5/2013 | Tankovich et al. |
| 2013/0111328 A1 | 5/2013 | Khanna et al. |
| 2013/0218836 A1 | 8/2013 | Sullivan et al. |
| 2013/0247006 A1 | 9/2013 | Trowbridge |
| 2013/0275560 A1* | 10/2013 | Bestmann ............... H04L 41/08 709/219 |
| 2013/0304729 A1 | 11/2013 | Jiang et al. |
| 2013/0318207 A1 | 11/2013 | Dotter |
| 2014/0026113 A1 | 1/2014 | Farooqi |
| 2014/0109080 A1 | 4/2014 | Ricci |
| 2014/0129265 A1 | 5/2014 | Arena et al. |
| 2014/0281891 A1 | 9/2014 | Sulcer et al. |
| 2014/0310724 A1 | 10/2014 | Chan et al. |
| 2015/0040104 A1 | 2/2015 | Mall et al. |
| 2015/0074407 A1 | 3/2015 | Palmeri et al. |
| 2015/0082239 A1 | 3/2015 | Zhao et al. |
| 2015/0095471 A1 | 4/2015 | Singh et al. |
| 2015/0156061 A1 | 6/2015 | Saxena et al. |
| 2015/0178724 A1 | 6/2015 | Ngo et al. |
| 2015/0185997 A1 | 7/2015 | Jain |
| 2015/0309789 A1 | 10/2015 | Thorat |
| 2015/0309811 A1 | 10/2015 | Wisgo |
| 2015/0339746 A1 | 11/2015 | Desai et al. |
| 2015/0379152 A1 | 12/2015 | Bentley et al. |
| 2016/0021215 A1 | 1/2016 | Spencer |
| 2016/0092339 A1 | 3/2016 | Straub et al. |
| 2016/0094654 A1 | 3/2016 | Raman et al. |
| 2016/0117388 A1 | 4/2016 | Fan |
| 2016/0142858 A1 | 5/2016 | Molinet et al. |
| 2016/0142859 A1 | 5/2016 | Molinet et al. |
| 2016/0191639 A1* | 6/2016 | Dai ..................... G06Q 30/0255 709/204 |
| 2016/0234330 A1* | 8/2016 | Popowitz ............ H04L 67/2814 |
| 2016/0239284 A1 | 8/2016 | Boudville |
| 2016/0292728 A1 | 10/2016 | Kang et al. |
| 2016/0335333 A1 | 11/2016 | Desineni et al. |
| 2017/0031874 A1 | 2/2017 | Boudville |
| 2017/0046141 A1 | 2/2017 | Desineni et al. |
| 2017/0046142 A1 | 2/2017 | Desineni et al. |
| 2017/0060823 A1* | 3/2017 | Zheng ................... G06F 16/248 |
| 2017/0076471 A1 | 3/2017 | Prophete et al. |
| 2017/0109004 A1* | 4/2017 | Ghosh ..................... H04L 67/22 |
| 2017/0132023 A1 | 5/2017 | Desineni et al. |
| 2017/0132024 A1 | 5/2017 | Desineni et al. |
| 2017/0257216 A1* | 9/2017 | Perga ..................... G06F 21/44 |

FOREIGN PATENT DOCUMENTS

| | | |
|---|---|---|
| KR | 10-2013-0112613 A | 10/2013 |
| WO | 2012/174457 A2 | 12/2012 |
| WO | WO-2012174457 A2 * | 12/2012 ......... G06Q 30/0251 |

OTHER PUBLICATIONS

MDL (Mobile Deep Linking); http://mobiledeeplinking.org; 2014.
Buchanan et al.; The Right Way to Swizzle in Objective-C; New Relic blog. N.p.; 2016; Web; Apr. 16, 2014.
Austin; Technical Guide to Android Deep Linking: URI Schemes; Blog.branch.io. N.p.; 2016; Web; Aug. 8, 2016.
Internet Engineering Task Force (IETF); URI Template—J. Gregorio, Google—R. Fielding, Adobe—M. Hadley, Mitre—M. Nottingham, Rackspace—D. Orhcard; Salesforce.com; Mar. 2012.
International Search Report and Written Opinion for PCT Application No. PCT/IB2016/055211 dated Dec. 8, 2016.
International Search Report and Written Opinion for PCT Application No. PCT/IB2016/055213 dated Dec. 16, 2016.
International Search Report and Written Opinion for PCT Application No. PCT/IB2016/054880 dated Dec. 2, 2016; 11 pages.
Georgiev et al.; Breaking and Fixing Origin-Based Access Control in Hybrid Web/Mobile Application Frameworks; The University of Texas D at Austin—NODS Symp; Feb. 2014; 2014; 1-15.
Ravindranath et al.; Appinsight: Mobile App Performance Monitoring in the Wild; [Online]; 2012, pp. 107-120; [Retrieved from Internet on Jun. 6, 2017]; https://www.usenix.org/system/files/conference/osdi12/osdi12-final-91.pdf.
Baret et al.; Towards a Monitoring Feedback Loop for Cloud Applications; [Online]; 2013; pp. 43-44; [Retrieved from Internet on Jun. 6, 2017], https://research.spec.org/icpeproceedings/2013/multicloud/p43.pdf.
Medler et al.; Data Cracker: Developing a Visual Game Analytic Tool for Analyzing Online Gameplay; [Online]; 2011; pp. 1-10;

(56) References Cited

OTHER PUBLICATIONS

[Retrieved from Internet on Jun. 6, 2017], http://delivery.acm.org/10.1145/1980000/1979288/p2365-medler.pdf.
Nacar et al.; GTLAB: Grid Tag Libraries Supporting Workflows within Science Gateways; [Online]; 2007; pp. 194-199; [Retrieved from Internet on Jun. 6, 2017]; http://ieeexplore.ieee.org/stamp/stamp.jsp?arnumber=4438533.
Chinese Office Action with English translation dated Nov. 20, 2019; Chinese Appln. No. 201680048336.2.

* cited by examiner

SYSTEM AND METHOD FOR IDENTIFYING, INDEXING, AND NAVIGATING TO DEEP STATES OF MOBILE APPLICATIONS

CROSS-REFERENCE TO RELATED APPLICATIONS

This application is a continuation application of prior application Ser. No. 15/236,140, filed on Aug. 12, 2016, which claimed the benefit of U.S. Provisional Application No. 62/274,152, filed Dec. 31, 2015, U.S. Provisional Application No. 62/252,357, filed Nov. 6, 2015, and U.S. Provisional Application No. 62/204,960, filed Aug. 13, 2015. The entire disclosures of the applications referenced above are incorporated by reference.

FIELD

The present disclosure relates generally to mobile application development and more specifically to deep linking to specific states of mobile applications.

BACKGROUND

This section provides background information related to the present disclosure and is not necessarily prior art.

An application (referred to interchangeably in this disclosure as an "app"), such as a mobile app, may contain multiple deep states. For example, in an app that rates the quality of restaurants based on social media opinion data, the detail page for each restaurant would be considered a deep state. Deep states are reachable from within the app through a sequence of user actions that can involve navigating through multiple menu screens (or, views) as well as interactions with user interface elements. Each of these menu screens and user interface elements can be mediated by a unique view controller associated with that displayed screen.

Usually, these deep states are accessible only from within the app itself web search engines operating outside the app, for example, cannot reach the deep states within the app. This means that when a user conducts a conventional web search for restaurants and wants to explore one of the returned choices in a specialized restaurant rating app, the user would have to manually copy and paste the name of the selected search result into the search field of the restaurant rating app and command the restaurant ranking app to access its internal deep state corresponding to the selected restaurant. This represents undesirable additional interaction required of the user.

If deep states of apps could be exposed to external apps and computer processes, the user could enjoy additional functionality and convenience. For example, the user could begin a search for a suitable restaurant using an Internet-based search server and then, by selecting one of the results of that search, be automatically led to the appropriate deep linked page of a specialized restaurant ranking app.

However, implementing such functionality requires developer effort and requires deep linking expertise that the developer may not possess. When app development is limited by time, budget, or expertise, deep link functionality for some or even all of the states of an app may not be a high enough priority to get implemented.

Mobile operating systems, such as the iOS operating system from Apple Inc. and the Android operating system from Google Inc., may allow a developer to provide data to the operating system for indexing. In the iOS operating system, this may take the form of a CSSearchableItem (where the CS stands for Core Spotlight) object. The developer may implement code that bookmarks certain states of an app by providing information about those states to the operating system. In the iOS operating system, this may take the form of an NSUserActivity object (where NS stands for NeXTSTEP).

Then, users can perform a search through the operating system, where relevant data or states from the developer's app are identified. If a user selects one of those activities from an operating system interface, such as a search dialogue or a recent tasks menu, the developer's code can restore the app to the state corresponding to the bookmarked activity. A bookmarked activity on a first device may even be continued on a different device (assuming the app is also installed on the other device). Via inter-device communication, the operating system of the first device notifies the operating system of the other device what state the user was most recently interacting with.

In addition, the developer may specify that certain types of data, such as telephone numbers and names from a contact database maintained by the app, be indexed by the operating system. When a user indicates to the operating system that one of those data objects (for example, a certain contact) is of interest, the developer's code can transition to a state of the app that presents that data object for viewing or editing.

In order to take advantage of these operating system capabilities, the developer may implement code that can restore the app to a state based on indicated activity or data object. However, these activities and data objects may be known only to the operating system or to search systems maintained by a developer of the operating system. In other words, third party apps and search services may be unable to access this data and navigate directly to the states or data objects within the app.

Further, developing code to display data objects, index data objects, bookmark activities, and continue activities requires developer effort and may not be accomplished for any of an app's states much less for all of the app's states. As a result, these enhanced operating system capabilities may not be available for a variety of states of an app and may also not be accessible to third party apps and search systems.

In FIG. 1, the enhanced operating system functionality is graphically depicted. On a user device, an operating system 100 executes a first app (referred to as "App A") 104. App A 104 includes a representative set of views, View A 108-1, View B 108-2, View C 108-3, View D 108-4, and View E 108-5 (collectively, views 108). The views 108 may be managed by one or more view controllers, which may be developed according to the model-view-controller (MVC) software architecture pattern.

As an example only, App A 104 is a restaurant information app, View A 108-1 is a home (or, default) state of App A 104 from which restaurant searches by cuisine, geography, etc. can be performed. Continuing the example, View B 108-2 is a two-dimensional app interface showing restaurant locations, View C 108-3 is a restaurant detail view, View D 108-4 is a list of restaurants by cuisine, and View E 108-5 is a list of recently-reviewed restaurants. In various implementations, including this example, a single view may be a template populated with entity-specific data. For example, View C 108-3 may have a visual layout for a restaurant specifying where a photo of the restaurant will be located, the location, size, and font face of the restaurant's name, how reviews will be summarized, etc. The visual layout view will be instantiated with data corresponding to a specific restaurant from a data store.

App A 104 selects and provides data objects to the operating system 100 for indexing. For example, App A 104 may provide the names of each of the specific cuisines encompassed by App A 104. The operating system 100 can then provide results to users who are searching by that cuisine name.

App A 104 includes an activity handler 112 that receives a continue user activity signal from the operating system 100. For example, the continue user activity signal may specify that a certain cuisine type was of interest to a user. The activity handler 112 then invokes View D 108-4 and populates View D 108-4 with results corresponding to the specified cuisine. App A 104 may be selective regarding which cuisines to provide to the operating system 100 for indexing because providing too many data objects may lead to a decrease in their average relevance. This may cause the operating system 100 to down-rank or even remove indexed objects from search results that do not appear to have high relevance.

App A 104 may, therefore, include programming that indexes a list of the most popular cuisines or cuisines whose names are more likely to be unique to cuisines. For example, while "American" may be a cuisine name, there is a high false positive rate because this term applies to many other searches than simply cuisine. However, if a user indicates interest in a cuisine, such as by reviewing the restaurant listings for a certain cuisine one or more times, App A 104 may add that cuisine name to the list of objects to index by the operating system 100.

In addition, App A 104 may indicate to the operating system 100, using an activity object, that a user is currently viewing restaurant results for a particular cuisine. This allows the operating system 100 to maintain essentially a history of activities performed by the user within App A 104. In addition, the most recent activity engaged in by the user can be shared with another device, allowing a hand-off of user interaction with that activity from one device to another. Submitting an activity object to the operating system, allowing later resumption of the activity on the same or another device, is referred to in this disclosure as bookmarking the activity.

Activity objects may be sent to the operating system 100 when the user enters View B 108-2 to view restaurant results in a map display. For example, the activity object sent to the operating system 100 may include a latitude and longitude at a center of the map. If the user adjusts the center of the map, App A 104 may provide an updated activity object to the operating system 100 indicating the new center point. App A 104 may further include in the activity object additional data such as filters. For example, the user may have restricted the displayed results to only those restaurants that are currently open. This filter may be identified in the activity object provided to the operating system 100.

The activity handler 112 may receive a continue user activity signal from the operating system 100 indicating that the user is interested in continuing a map view of restaurants at a certain center point with a certain set of filters. For example only, in the iOS operating system, this may take the form of a continueUserActivity call to the app delegate of the app. The activity handler 112 then invokes View B 108-2 with the provided parameters and presents the user with the desired map view. The continue user activity signal may have been received from another device on which the user was previously viewing that map display. As shown in FIG. 1, the activity handler 112 is programmed to invoke View B 108-2, View D 108-4, and View E 108-5, but not View A 108-1 or View C 108-3.

In the operating system 100, a search index 120 receives data objects from App A 104. The search index 120 also receives data objects from other apps and, in some implementations, from the operating system 100 itself, such as the names of frequently-accessed device settings. For example only, in the iOS operating system, the search index 120 may be referred to as Spotlight and the data objects provided to the search index 120 may take the form of CSSearchableItem objects.

The search index 120 may also receive activity metadata from an activity tracker 124. The activity tracker 124 receives activity objects, including from App A 104. An activity object may take the form of an NSUserActivity object. An activity object received by the activity tracker 124 may include metadata similar to that of a data object. The metadata can be indexed by the search index 120. The metadata may take the form of a CSSearchableItemAttributeSet object, which may be the same form used in CSSearchableItem objects.

Activities indicated as public may be shared with a cloud index maintained by the developer of the operating system 100. A cloud index interface 128 provides the public activities to the cloud index. These public activities are selectively indexed by the cloud index, allowing other users to search for and find activities generated by App A 104 even when App A 104 is not installed on their devices.

A handoff controller 132 shares the latest activity with other devices. In various implementations, the other devices have been authenticated to the handoff controller 132 to indicate that they have permission to receive the latest activities from the present device. These other devices can, therefore, allow a user to begin an activity on the device where the operating system 100 is executed and resume the activity on another device.

A search interface 136 allows a user to perform a search, such as by entering a text query. The search index 120 provides relevant search results to the search interface 136 and, upon a user selection, the user-selected result is provided to the activity tracker 124. The activity tracker 124 identifies which app corresponds to the user-selected result and sends a continue user activity signal to the relevant app. The continue user activity signal may include an indicator whether the continue user activity signal pertains to a data object or an activity object.

SUMMARY

A mobile application development system includes a developer portal and an offline analysis system. The developer portal is configured to receive a copy of a first application from a first developer and provide a routing library to the first developer for incorporation into the first application prior to the first developer distributing an augmented application via a digital distribution platform. The routing library is incorporated into the first application to form the augmented application. The offline analysis system is configured to analyze the first application to (i) determine a set of activities that a handler within the first application is programmed to resume in response to respective resumption requests from a host operating system and (ii) determine parameters for each activity of the set of activities. The offline analysis system is configured to generate a set of links. Each link of the set of links corresponds to a respective activity of the set of activities. The routing library includes instructions configured to, subsequent to installation of the augmented application from the digital distribution platform onto a user device, receive a link from an operating system of the user device. The link identifies a first activity. The routing library includes instructions configured to generate a first resumption request based on parameters corresponding to the first activity and transmit the first resumption request to the handler of the augmented application.

In other features, the parameters corresponding to the first activity include an activity type and an activity title. In other features, the first resumption request is transmitted by a continueUserActivity call to an app delegate of the augmented application. In other features, the first activity includes an NSUserActivity object.

In other features, the offline analysis system is configured to (i) analyze the first application to determine a set of data objects that the handler within the first application is programmed to access in response to respective resumption requests from the host operating system, (ii) determine parameters for each data object of the set of data objects, and (iii) generate a second set of links. Each link of the second set of links corresponds to a respective data object of the set of data objects. The routing library includes instructions configured to, subsequent to installation of the augmented application in the user device, receive a second link from an operating system of the user device. The second link identifies a first data object. The instructions are further configured to generate a second resumption request based on parameters corresponding to the first data object and transmit the second resumption request to the handler of the augmented application.

In other features, the first data object is a CSSearchableItem object. In other features, by incorporating the routing library, the augmented application is configured to register a first uniform resource identifier (URI) template with the operating system upon installation. The link conforms to the first URI template. In other features, the first URI template specifies a scheme includes a text string ending with a colon and two forward slashes. The scheme is unique to the augmented application. The text string is a concatenation of a text identifier associated with the developer portal and a name of the first application. The link begins with the scheme.

In other features, the offline analysis system is configured to execute the first application and, during execution, monitor a sequence of user interface (UI) events initiated by an operator starting from an initial state and proceeding to a first state. The offline analysis system is configured to store the sequence of UI events as a first data structure corresponding to the first state. The routing library includes instructions configured to, in response to a user of the user device encountering the first state while using the augmented application, transmitting a bookmark to the operating system. The instructions are configured to, in response to receiving a resumption request indicating the first state from the operating system, replay the sequence of UI events from the first data structure.

In other features, the offline analysis system is configured to execute the first application and, during execution, monitor a sequence of user interface (UI) events initiated by an operator starting from an initial state and proceeding to a first state corresponding to a first data object. The offline analysis system is configured to store the sequence of UI events as a first data structure corresponding to the first data object. The routing library includes instructions configured to, in response to execution of the augmented application, selectively transmit the first data object to the operating system. The instructions are configured to, in response to receiving a resumption request indicating the first data object from the operating system, replay the sequence of UI events from the first data structure.

In other features, the link selectively includes serialized data. The routing library includes instructions configured to decode the parameters corresponding to the first activity from the serialized data within the link. In other features, the link selectively includes a unique identifier. The routing library includes instructions configured to retrieve the parameters corresponding to the first activity based on the unique identifier.

In other features, the mobile application development system includes a data server configured to store a plurality of parameters corresponding to activities determined by the offline analysis system. The routing library includes instructions configured to, upon the first execution of the augmented application, download the parameters corresponding to at least the first activity from the data server for storage in a data store local to the routing library. The routing library includes instructions configured to retrieve the parameters corresponding to the first activity from the data store in response to the unique identifier.

A system includes the above mobile application development system and a search system configured to return results to the user device in response to a search commissioned by a user of the user device. A first result of the returned results includes the link. In response to selection of the first result by the user, the link is transmitted to the routing library by the operating system.

A method of operating a mobile application development system includes receiving a copy of a first application from a first developer. The method includes providing a routing library to the first developer for incorporation into the first application prior to the first developer distributing an augmented application via a digital distribution platform. The routing library is incorporated into the first application to form the augmented application. The method includes analyzing the first application to (i) determine a set of activities that a handler within the first application is programmed to resume in response to respective resumption requests from a host operating system and (ii) determine parameters for each activity of the set of activities. The method includes generating a set of links. Each link of the set of links corresponds to a respective activity of the set of activities. The routing library includes instructions configured to, subsequent to installation of the augmented application from the digital distribution platform onto a user device. The instructions are further configured to receive a link from an operating system of the user device. The link identifies a first activity. The instructions are further configured to generate a first resumption request based on parameters corresponding to the first activity. The instructions are further configured to transmit the first resumption request to the handler of the augmented application.

In other features, the parameters corresponding to the first activity include an activity type and an activity title. In other features, the first resumption request is transmitted by a continueUserActivity call to an app delegate of the augmented application. In other features, the method includes analyzing the first application to determine a set of data objects that the handler within the first application is programmed to access in response to respective resumption requests from the host operating system. The method includes determining parameters for each data object of the set of data objects. The method includes generating a second set of links. Each link of the second set of links corresponds to a respective data object of the set of data objects. The routing library includes instructions configured to, subsequent to installation of the augmented application in the user device. The instructions are further configured to receive a second link from an operating system of the user device. The second link identifies a first data object. The instructions are further configured to generate a second resumption request based on parameters corresponding to the first data object. The instructions are further configured to transmit the second resumption request to the handler of the augmented application.

In other features, the first data object is a CSSearchableItem object. In other features, by incorporating the routing library, the augmented application is configured to register a first uniform resource identifier (URI) template with the operating system upon installation. The link conforms to the first URI template. In other features, the method includes executing the first application and, during execution, monitoring a sequence of user interface (UI) events initiated by an operator starting from an initial state and proceeding to a first state. The method includes storing the sequence of UI events as a first data structure corresponding to the first state. The routing library includes instructions configured to, in response to a user of the user device encountering the first state while using the augmented application, transmitting a bookmark to the operating system. The instructions are further configured to, in response to receiving a resumption request indicating the first state from the operating system, replay the sequence of UI events from the first data structure.

In other features, the method includes executing the first application and, during execution, monitor a sequence of user interface (UI) events initiated by an operator starting from an initial state and proceeding to a first state corresponding to a first data object. The method includes storing the sequence of UI events as a first data structure corresponding to the first data object. The routing library includes instructions configured to, in response to execution of the augmented application, selectively transmit the first data object to the operating system.

The instructions are further configured to, in response to receiving a resumption request indicating the first data object from the operating system, replay the sequence of UI events from the first data structure. In other features, the link selectively includes serialized data. The routing library includes instructions configured to decode the parameters corresponding to the first activity from the serialized data within the link. In other features, the link selectively includes a unique identifier. The routing library includes instructions configured to retrieve the parameters corresponding to the first activity based on the unique identifier.

In other features, the method includes storing, in a data store, a plurality of parameters corresponding to the determined set of activities. The routing library includes instructions configured to, upon first execution of the augmented application, download the parameters corresponding to at least the first activity from the data store for storage in a data store local to the routing library. The routing library includes instructions configured to retrieve the parameters corresponding to the first activity from the data store in response to the unique identifier.

Further areas of applicability of the present disclosure will become apparent from the detailed description, the claims, and the drawings. The detailed description and specific examples are intended for purposes of illustration only and are not intended to limit the scope of the disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Introduction

Figure 1:
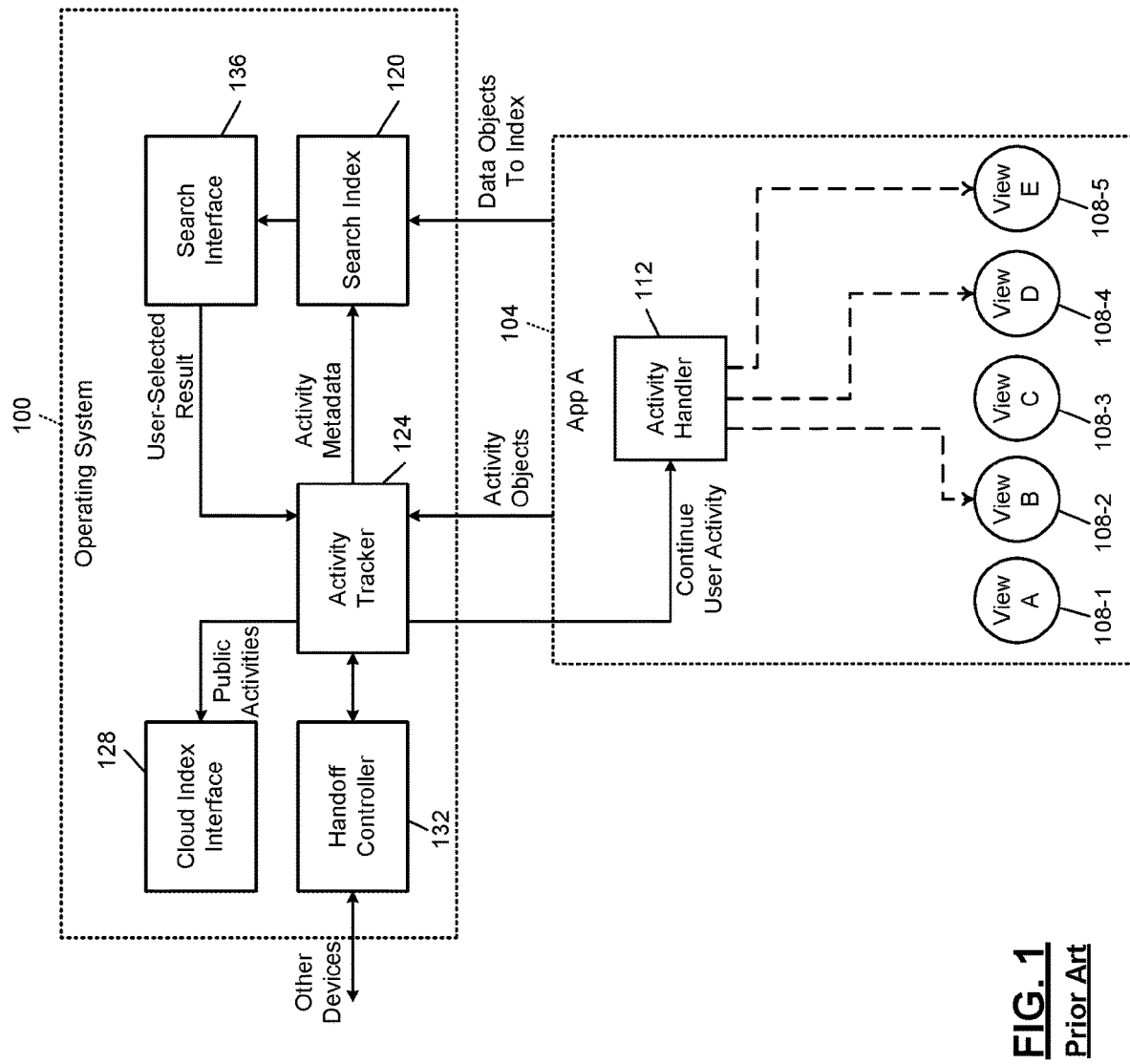
FIG. 1 is a graphical illustration and functional block diagram of an example app interacting with operating system app indexing functionality.

A developer of an app may write code to take advantage of operating system (OS) functionality that allows, in one example, an activity within the app to be bookmarked for the user to return to later or for the activity to be resumed on another of the user's devices. The developer may also write code that submits data to the OS for indexing so that the OS can surface the data, such as in response to an OS-wide search.

In order to implement this functionality, the developer writes code that allows the app to resume to an activity indicated by the OS or to a state that interacts with a data object specified by the OS. In some implementations, the activity object received from the OS fully specifies the activity for the app to resume, even if this particular copy of the app has not performed that activity previously.

Meanwhile, for data objects, some apps may be able to show a state of the app corresponding to a certain data object only if that data object has been stored by the present copy of the app. In other implementations, or for certain apps, certain data objects may fully specify the state to which the app should return to view that data object. This generally means that the data for the data object is either known by the app, accessible to the app, or provided to the app from the OS within the continue user activity request. For data objects that do not fully specify the state of an app, these data objects may be specific to the app where they were created, and cannot be accessed by other copies of the app.

Even though the developer may have implemented, for some or all states and for some or all data objects, the ability to resume that activity or navigate to that data object, there may be no provision for third parties, such as search services or other apps, to directly link to those activities or data objects within the app. The present disclosure identifies activities implemented by the developer and provides a library that, when presented with an appropriate deep link, can invoke the internal activity handling of the app. This allows the developer's efforts in interacting with the OS to be leveraged to provide deep link access to third parties.

For some apps, the developer may not have implemented OS search functionality for some states and for some data. For some apps, the developer may not have implemented that functionality for any states or any data. The present disclosure, therefore, describes how the developer can specify which states of an app should have this functionality enabled. The present disclosure describes how the application can be supplemented to enable this functionality for the app, such as by recording sequences of user interface events that can be replayed to reach deep states of the app.

When a routing library according to the principles of the present disclosure is used to enable activity bookmarking and data indexing, the configuration of the routing library may be specified by the developer. In various implementations, an agent of the developer may be able to make configuration decisions, such as which states to bookmark and which data to index, and those configuration decisions are relayed to the routing library. In various implementations, the routing library may periodically update this configuration so that the developer can change the configuration even for apps already installed on devices.

A developer portal may allow even non-programmers working with the developer to specify business rules. For example, a marketing or user experience professional at the developer may specify what data to submit to the OS for indexing in order to optimize the search relevancy of the app for a given OS.

A developer portal according to the present disclosure provides a routing library to the developer for integration into an app, and that routing library implements the above functionality. For example, based on configuration data, the routing library may bookmark certain activities with the OS and may submit certain data objects for indexing to the OS. The configuration data may be generated at the time of onboarding the app, and may be generated manually, with artificial intelligence, or with operator-supplemented artificial intelligence.

In addition, the routing library may service continuing activity requests from the OS, such as by executing a series of user interface events to return to the selective activity or to display the selected data. The routing library may also handle incoming links, such as from other apps or from browser instances.

The routing library may take the form of a dynamic link library (DLL), a dylib, or a software development kit (SDK). The routing library may be downloaded by the developer and imported into the integrated development environment (IDE) of the developer, such as the Xcode IDE from Apple Inc. In some implementations, the routing library is either already compiled or includes make files and other configuration files allowing the routing library to be compiled.

The developer may integrate the routing library simply by instructing the IDE to add the routing library to their app's project, such as by adding the routing library to an import list or to a list of included code modules. The developer may also need to update a configuration file to indicate that the routing library will handle certain uniform resource identifiers (URIs) or activity types. The configuration file may take the form of an information property list (Info.plist) file. In various implementations, a script may be provided along with the routing library that performs the configuration file update as well as the import of the routing library into the current IDE project.

Meanwhile, the developer portal supplies the app to an offline analysis system that determines how to access states of interest. The states of interest may be specified by the app developer or determined by the developer portal. In brief, an offline analysis system of the developer portal determines what sequence of user interface (UI) actions a user would take to reach a state of interest. That UI action sequence can be replayed by the routing library within an app on a user's device to arrive at the state of interest. In other words, the routing library simulates the UI actions users would themselves perform to reach a deep state.

By simulating the UI actions, the routing library avoids the user having to perform each UI action and will generally be far faster than a user manually performing the sequence of UI actions. The user may not even see some of the intermediate states when the routing library is navigating to the deep state of interest, or these intermediate states may only be visible briefly.

The UI action sequences for the deep states of an app may be integrated into the app along with the routing library, or may be downloaded by the routing library once the app is installed. In some implementations, a UI action sequence can be encoded as part of a link designating the app and serviced by the routing library.

Without further effort from the developer, the app now has deep link functionality that can be accessed from external sources. For example, a search system could provide results that lead directly to deep states of the app. Or a third party app could easily direct users to deep states of the app. This may increase the visibility of the app and allow for tighter integration and better overall user experience with the app.

In addition, now that the developer portal is responsible for deep linking, deep links can be added or modified without requiring assistance from the developer's software programmers, who may be working on other projects and have other priorities. In other words, a business person, such as an advertising or marketing professional working for an app developer, may use the developer portal to identify which states of the app should be deep-linkable. The business person could even remove states from the list of deep-linked states, all without requiring the assistance of a software programmer.

Block Diagram

Figure 2:
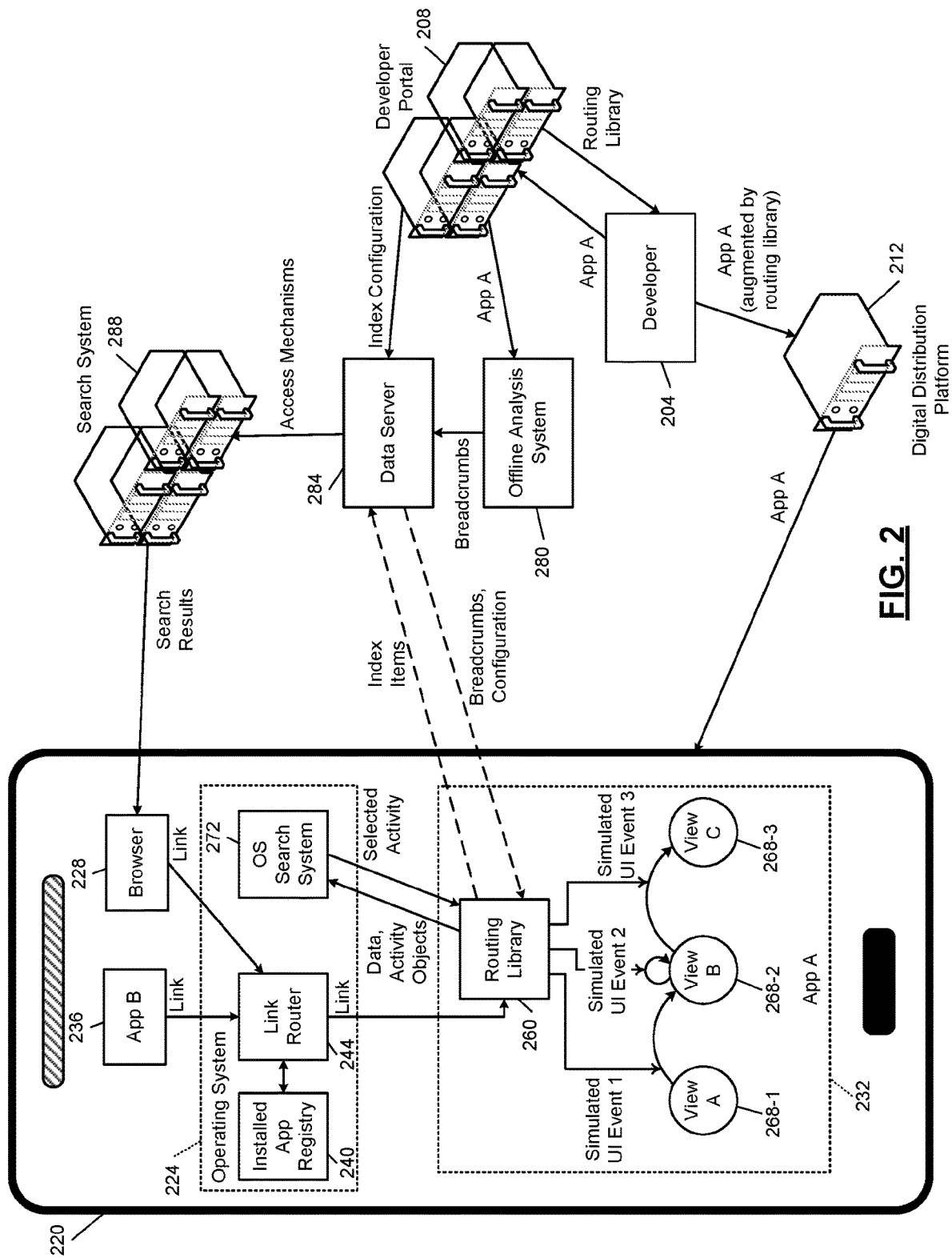
FIG. 2 is a high-level functional block diagram of a mobile application environment according to the principles of the present disclosure.

In FIG. 2, additional details are presented. As noted above, a developer 204 provides an app (referred to as "App A") to a developer portal 208. The developer portal 208 provides a copy of a routing library to the developer 204 for incorporation into App A, creating an augmented version of App A.

The developer 204 provides the augmented App A, which is still referred to below as App A for simplicity, to a digital distribution platform 212 for distribution to end users. The digital distribution platform 212 provides native apps to user devices and may be specific to an OS. Example digital distribution platforms include the GOOGLE PLAY digital distribution platform by Google, Inc., the APP STORE digital distribution platform by Apple, Inc., and the WINDOWS PHONE digital distribution platform by Microsoft Corp. If the developer 204 had already provided App A to the digital distribution platform 212 before augmentation with the routing library, the developer 204 can release the augmented App A as a new version of App A.

The user of a user device 220 installs App A (as augmented) from the digital distribution platform 212. In the user device 220, one or more processors (which may encompass general purpose processors as well as additional co-processors, such as physical sensor processors and graphics processors) execute instructions from memory.

Some of these instructions correspond to an operating system 224, a browser 228, an installed copy of App A (referred to as App A 232), and a third party app (App B 236). The operating system 224 includes an installed app registry 240 and a link router 244. The link router 244 receives links, such as URLs (uniform resource locators) and URIs (uniform resource identifiers), and determines how to handle those links.

Generally, the link router 244 handles a link by forwarding it to a registered receiver. The link router 244 checks the installed app registry 240 to determine whether an app has claimed a particular scheme, domain, or other filter that matches the link. If not, the link may be passed to the browser 228, which may have registered a set of schemes for protocols such as HTTP (hypertext transfer protocol), HTTPS (HTTP secure), FTP (file transfer protocol), Telnet, and Gopher.

In some implementations, when the link specifies a web server address, the link router 244 may contact the web server to obtain a list of authorized apps. In this way, the link router 244 verifies that an app that has registered a certain domain is authorized by that domain to handle links. This prevents apps from commandeering links to which they're not eligible. If an app that has registered a domain is authorized by the web server host of that domain, the link router 244 can provide the link to the registered app.

Routing library 260, received from the developer portal 208, causes App A 232 to register a specific scheme or domain with the installed app registry 240. The scheme may be based on an identifier of the developer portal 208 as well as an identifier of App A. For example, a test string associated with the developer portal 208 (such as "portal") may be concatenated with a text string corresponding to App A (such as "appa"). As a specific example, the scheme registered by App A 232 may be "portal-appa://". In other implementations, the text string associated with the developer portal 208 may not be human-readable.

When the link router 244 receives a link, such as from the browser 228, where the scheme matches "portal-appa://", the link router 244 forwards that link to App A 232, where the link is received and handled by the routing library 260. The routing library 260 parses the link and navigates to a deep state indicated by the link.

For illustration only, in FIG. 2, View A 268-1, View B 268-2, and View C 268-3 (collectively, views 268) are shown. In many apps, more than three views will be present. In various implementations, multiple or all views may be controlled by a single view controller. In other implementations, each view may be controlled by a separate view controller.

For illustration only, the routing library 260 is shown simulating events from a predetermined UI event sequence identified by an example link. The link is received by the routing library 260 and corresponds to a deep state, specifically View C 268-3. The UI event sequence includes a first UI event, causing App A 232 to transition from View A 268-1 to View B 268-2, a second UI event, in which App A remains in View B 268-2, and then a third UI event, causing App A 232 to transition from View B 268-2 to View C 268-3. The routing library 260 would simulate these UI events in series.

A search system 272 of the operating system 224 receives data and activity objects from the routing library 260. The routing library 260 provides the data objects for indexing and the activity objects for bookmarking. The search system 272 allows a user to search for data and/or activities from App A 232. When the user selects an activity corresponding to App A 232, the search system 272 sends an indication of a selected activity to the routing library 260. The search system 272 is shown in more detail in FIG. 3A and FIG. 3B.

In parallel with providing the routing library from the developer portal 208 to the developer 204, the developer portal 208 provides App A to an offline analysis system 280. The copy of App A provided to the developer portal 208 may be a standard release build, such as an iOS App Store Package (ipa file).

In other implementations, the copy of App A provided to the developer portal 208 may be a special build that allows App A to be run in a simulator, and may include symbols, debugging info, and/or source code that would not ordinarily be present in an app distributed by the digital distribution platform 212. This may allow the offline analysis system 280 to more efficiently or accurately analyze App A. For example, the copy of App A may be a debug build designed to run in the Simulator application from Apple, Inc. on the OS X operating system. By contrast, the version of App A distributed by the digital distribution platform 212 is a standard release build.

The offline analysis system 280, as described in more detail below, determines UI event sequences that can be used by the routing library 260 to reach specific views of App A 232. A UI event sequence may be referred to as a breadcrumb trail composed of an ordered sequence of individual breadcrumbs (that is, UI events). For simplicity, in the remainder of this disclosure, the term breadcrumb will be used to refer to a breadcrumb trail.

The offline analysis system 280 may provide the determined breadcrumbs to a data server 284. The data server 284 includes a data store, such as a relational database, that stores breadcrumbs for each app processed by the offline analysis system 280. Each deep state of an app is associated with a corresponding breadcrumb. In some implementations, the data server 284 may be implemented as a cloud-based block storage service, such as the S3 (Simple Storage Service) service available from Amazon Web Services.

Access mechanisms define how deep states can be reached for such purposes as display advertisements and deep search results. For example, a search result may correspond to a specific deep state of an app. The search result may be a deep view card (DVC, see below) with a link including or indicating a breadcrumb corresponding to that deep state. Other potential access mechanisms for the search result may include a native deep link prepared by the app developer itself, or a standard URL pointing to a web edition of the app.

One of the available access mechanisms may be selected by a search system and provided along with the search result to a search client. In other implementations, multiple access mechanisms may be provided within the search result, and the search client determines which access mechanism to use in response to user selection of the search result. For example, a breadcrumb-based access mechanism may be chosen over a web-based access mechanism when business rules indicate a preference for results to render in native apps instead of in web editions of those apps.

The breadcrumb-based access mechanism, however, may only be available when the app is already installed. In some implementations, the search client may incorporate, or receive as part of the search result, code that scripts downloading and installing of the app, followed by actuation of a deep link. The deep link may be actuated by sending a breadcrumb-based URI to the newly-installed app.

The data server 284 may also store configuration settings, such as which deep states to allow links to, which deep states to bookmark as activities, and which data to index. This configuration may be specified by the developer 204 using the developer portal 208. The data server 284 may also receive index items from the routing library 260. For example, the routing library 260 may report activity objects back to the data server 284.

The data server 284 can then analyze user interaction with App A 232 and generate information about how to provide more relevant search results. In addition, data from the data server 284 may be provided back to the developer 204, essentially providing an easy way to instrument App A 232 to analyze user engagement. The data server 284 may correlate user activity across multiple apps on the user device 220, thereby further improving search results.

Routing Library Integration with Application

Figure 3A:
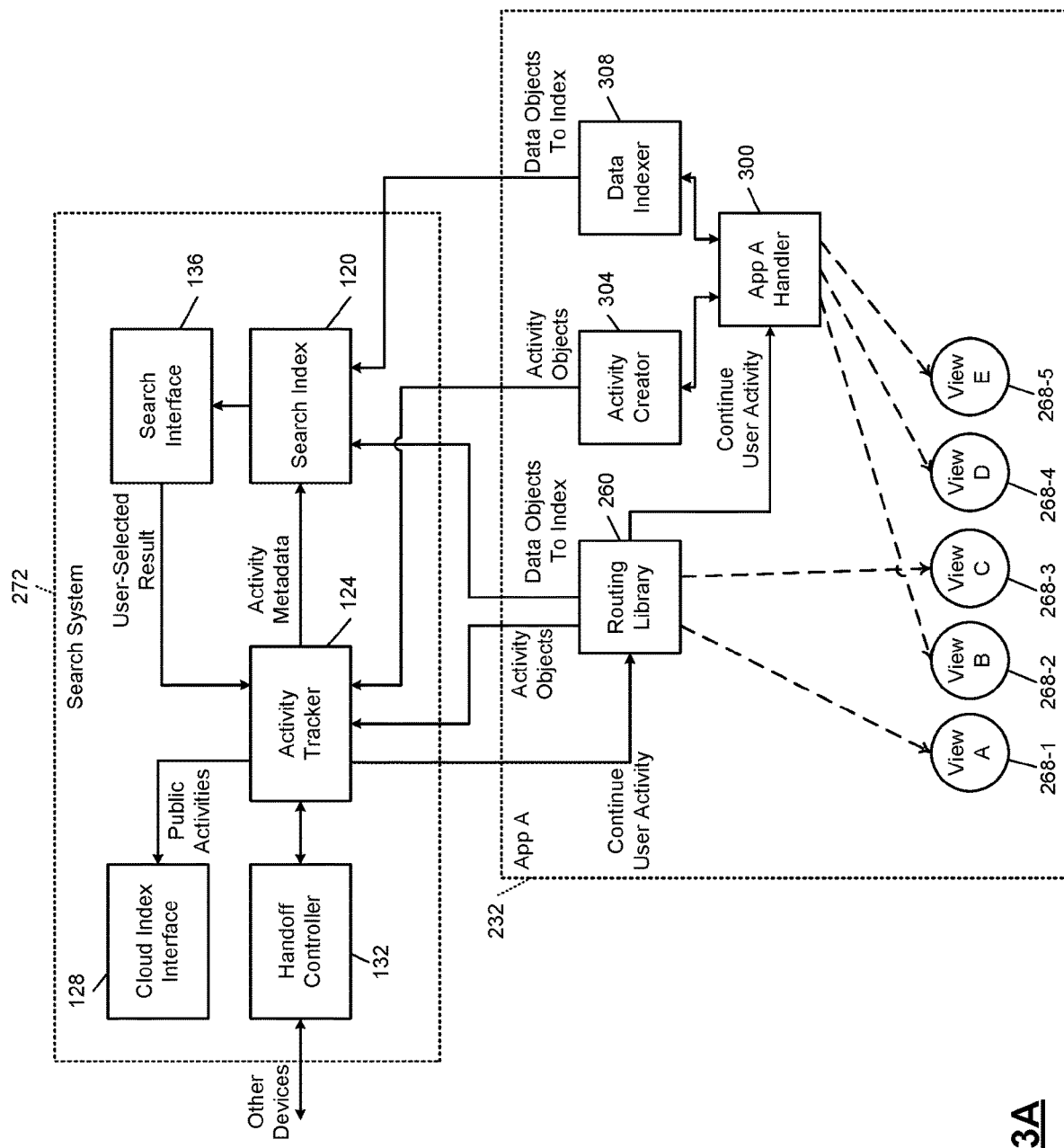
FIG. 3A is a functional block diagram of an example implementation of integration of a routing library with an example app.

In FIG. 3A, an example of App A 232 includes the routing library 260 and also includes an App A handler 300, which was created by the developer of App A 232. As seen in the example of FIG. 3A, the App A handler 300 is able to continue user activities relating to View B 268-2, View D-268-4, and View E-268-5. The App A handler 300 cooperates with an activity creator 304, which updates the search system 272 with activity objects indicating activities the user is performing with App A 232.

In various implementations, the search system 272 may include elements similar to those shown in the operating system 100 in FIG. 1. The activity creator 304 may send activity objects to the search system 272 based on user activities associated with View B 268-2, View D 268-4, and View E 268-5. The App A handler 300 also interfaces with a data indexer 308, which may provide data objects to the search system 272 related to View B 268-2, View D 268-4, and View E 268-5.

The routing library 260 is able to invoke View A 268-1 and View C 268-3 if the developer of App A 232 has requested that functionality through a developer portal. The routing library 260 may be able to access View A 268-1 and View C 268-3 by invoking respective view controllers, as described in more detail in U.S. patent application Ser. No. 15/235,650, filed Aug. 12, 2016, titled "Monitoring and Actuation of View Controller Parameters to Reach Deep States Without Manual Intervention," with first-named inventor Kalyan Desineni. The entire disclosure of this application is incorporated by reference.

In other implementations, the routing library 260 may access View A 268-1 and View C 268-3 by replaying sequences of user interface events that are determined in an offline process. For more information, see U.S. patent application Ser. No. 15/235,859, filed Aug. 12, 2016, titled "Deep Linking to Mobile Application States Through Programmatic Replay of User Interface Events," with first-named inventor Kalyan Desineni. The entire disclosure of this application is incorporated by reference.

While the activity creator 304 developed by the developer of App A 232 provides activity objects for some of the views 268 to the activity tracker 124, the routing library 260 is able to provide activity objects from others of the views 268. For example, the activity creator 304 may create an NSUserActivity object and invoke the becomeCurrent( ) method to provide the activity object to the activity tracker 124. It may be irrelevant to the activity tracker 124 whether the routing library or the App A handler 300 sent the activity object.

When the activity tracker 124 sends a continue user activity signal to App A 232, the routing library 260 traps (such as by overloading, overriding, or swizzling the continue user activity method) the continue user activity signal. If the continue user activity signal is relevant to the App A handler 300, the continue user activity signal is passed through to the App A handler 300. Otherwise, the routing library 260 handles the continue user activity signal.

Similarly, the routing library 260 and the data indexer 308 developed by the developer of App A 232 may each create CSSearchableItem objects and introduce them to the search index 120, such as by using the indexSearchableItems method. When the activity tracker 124 provides a continue user activity signal to the routing library 260 related to a data object, the routing library 260 either instantiates a view based on the selected data object or passes the continue user activity signal through to the App A handler 300.

The NSUserActivity object may include a unique identifier (such as a title) and an activity type. In a continue user activity signal, the activity type may differentiate an NSUseractivity object from a CSSearchableItem object. The NSUserActivity object may also include a list of text keywords to allow the object to be indexed. The NSUserActivity object may also include a set of metadata, such as a CSSearchableItemAttributeSet, which may include an image and other information. The set of metadata for an object may be displayed when the object is included in a set of search results and gives the user information about whether the object satisfies their query.

The CSSearchableItem object includes a unique identifier and a set of metadata, which may take the form of a CSSearchableItemAttributeSet. The CSSearchableItem object may also include an expiration date beyond which the object will be automatically de-indexed by the operating system. Further, the CSSearchableItem object may include a domain identifier to group related objects.

In various implementations, the routing library 260 and the App A handler 300 may both be able to instantiate one or more of the views 268. For example, the App A handler 300 may be programmed to instruct the activity creator 304 to bookmark activities with respect to View B 268-2. Meanwhile, the routing library 260 may be programmed to submit data for indexing from View B 268-2.

When a continue user activity signal is received by the routing library 260, if the continue user activity signal is related to a bookmarked activity, the routing library 260 passes through the continue user activity signal to the App A handler 300. Meanwhile, if the continue user activity signal for View B 268-2 is related to a data object, the routing library 260 itself navigates to View B 268-2 in order to display data related to the data object.

Although not shown in FIG. 3A, App A 232 may include an internal link router that receives deep links and instantiates views based on those deep links. For links including a scheme registered by the routing library 260, which is different than the scheme registered by the internal link router of App A 232, the routing library 260 receives the deep link and instantiates one of the views 268 based on the link. For example, the link may specify a breadcrumb to follow in order to arrive at the desired state.

The routing library 260 may override methods invoked by the activity creator 304 and the data indexer 308 to pass activity objects and data objects to the search system 272. In this way, the routing library 260 can first inspect the activity objects and data objects before then passing the activity objects data objects to the search system 272. The routing library 260 will then be aware of which activity objects have been created by the activity creator 304, and can, therefore, service deep links related to those activity objects. Similarly, the routing library 260 will know which data objects have been indexed by the data indexer 308, and can then service deep links related to those data objects.

In order to allow third party Apps and services to access App A 232 using those deep links, the routing library 260 may upload information from the activity objects and the data objects to a remote server. In order to service a deep link related to the activity objects from the activity creator 304 and the data objects from the data indexer 308, the routing library 260 can generate a continue user activity signal and send that signal to the App A handler 300. The App A handler 300 may be unaware that the continue user activity signal was received from the routing library 260 instead of from the search system 272. The App A handler 300 can then resume the activity or instantiate a review related to the index data as if the request came directly from the search system 272.

Figure 3B:
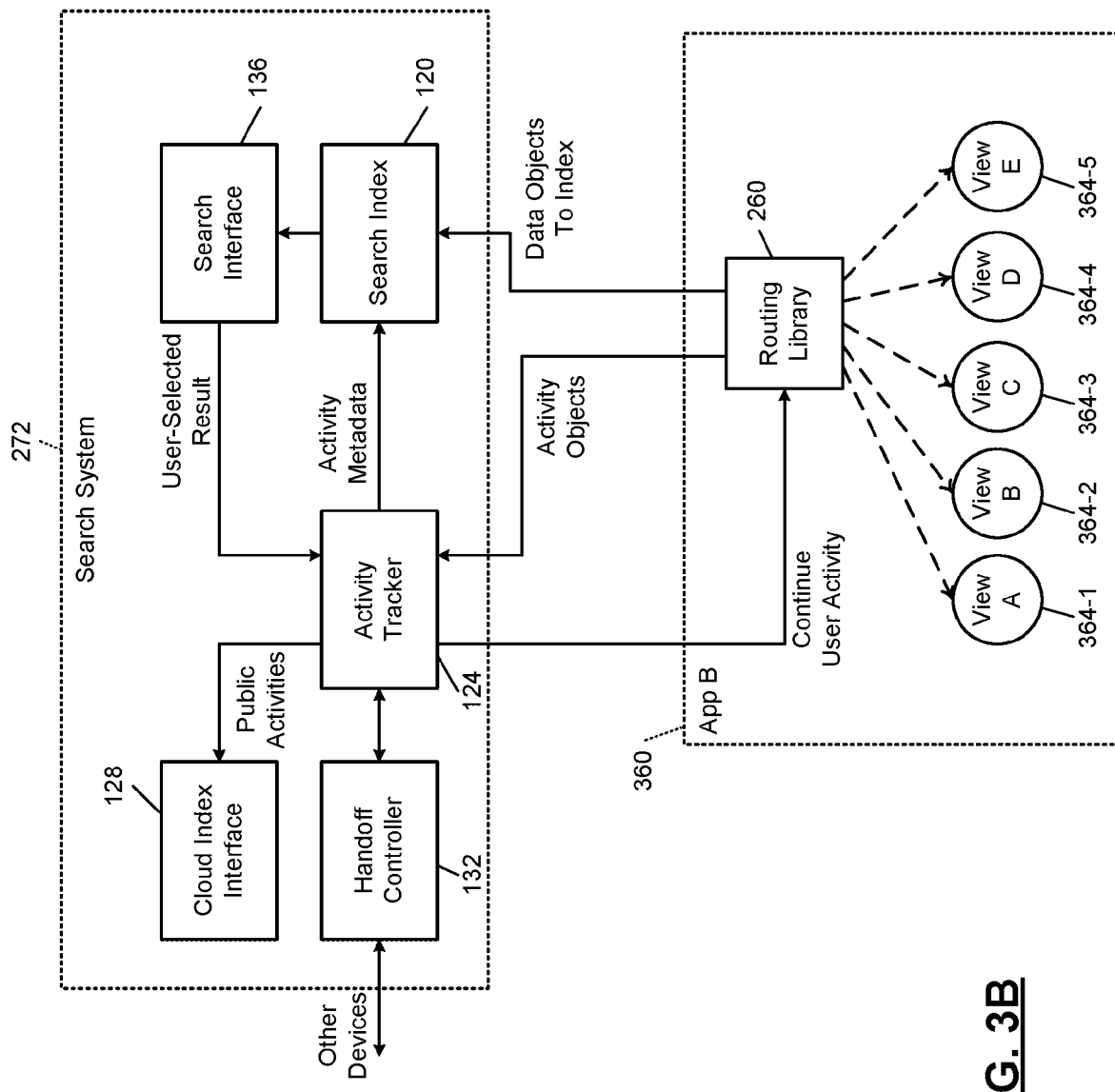
FIG. 3B is a functional block diagram of an example integration of routing library with another example app.

In FIG. 3B, another example app, App B 360, is shown. In App B 360, views 364-1, 364-2, 364-3, 364-4, and 364-5 (collectively, views 364) are shown for illustration. App B 360 does not include a built-in handler similar to the App A handler 300 of FIG. 3A. As a result, in order to access any of the views 364, the routing library 260 includes mechanisms (such as breadcrumbs) to access each of the views 364.

Further, the routing library 260 is solely responsible for generating activity objects and data objects to send to the search system 272. When a continue user activity signal is received by the routing library 260, the routing library 260 cannot pass the continue user activity signal through and instead is responsible for handling the resumption of an activity or a creation of a view related to a data object.

Routing Library

Figure 4:
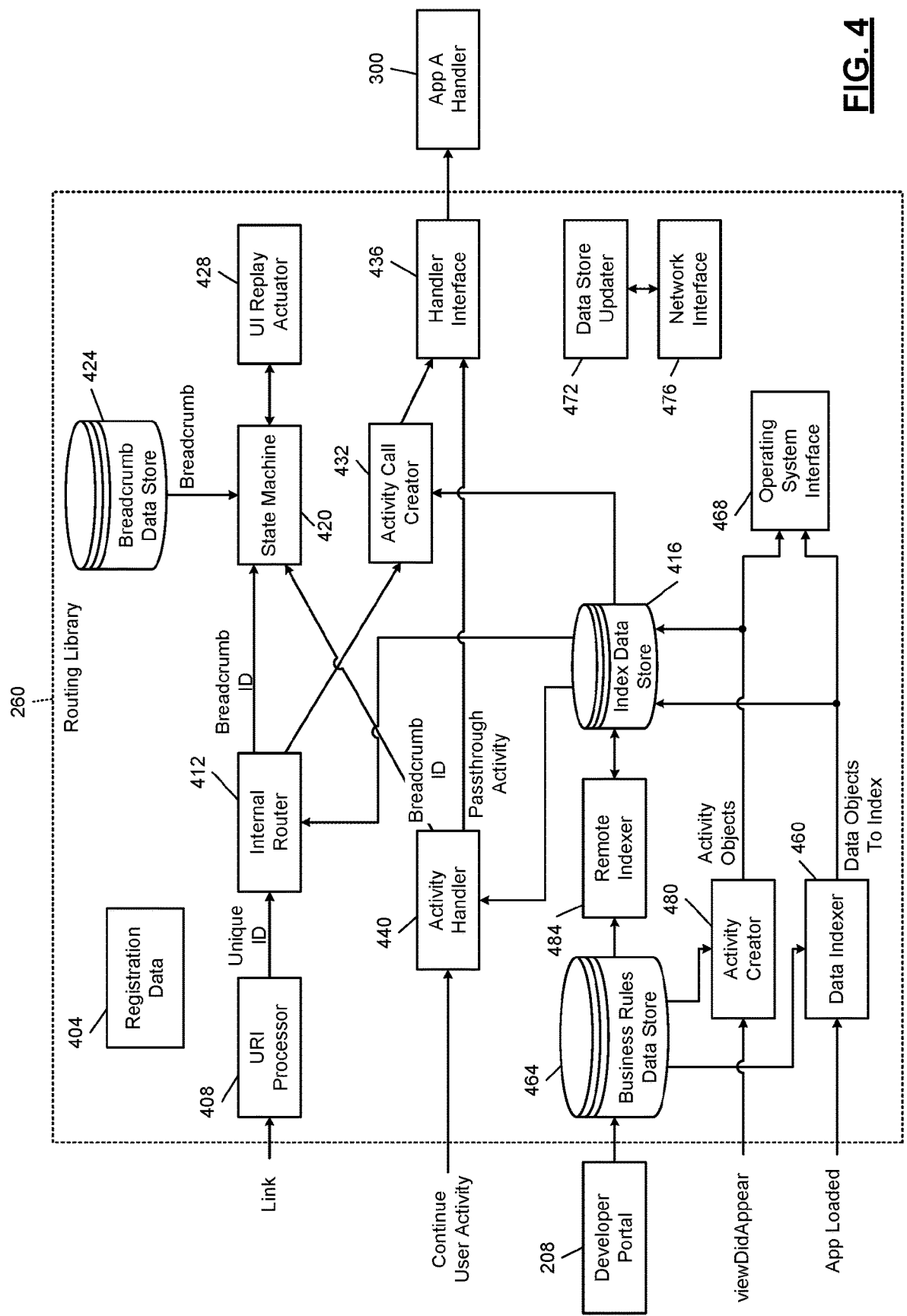
FIG. 4 is a functional block diagram of an example implementation of a routing library.

In FIG. 4, an example implementation of the routing library 260 includes registration data 404. The registration data 404 indicates to the operating system that the routing library 260 will handle links having a scheme relating to the routing library 260 and will also handle continue user activity signals relating to the app in which the routing library 260 is incorporated. In various implementations, the registration data 404 is included in a configuration file of the app into which the routing library 260 is incorporated.

A URI (uniform resource identifier) processor 408 receives a link from the operating system. For example, the link may have originated from a browser or from a third-party app. The URI processor 408 extracts a unique ID from the link, which may simply be the text within the URI to the right of the pair of forward slashes following the scheme.

An internal router 412 consults an index data store 416 to determine whether the unique ID from the URI corresponds to a breadcrumb or corresponds to an activity call that will be made to the App A handler 300. In other words, the internal router 412 decides whether a breadcrumb exists to reach the state indicated by the unique ID or whether an activity call should be made to the App A handler 300 to reach the state indicated the unique ID. When the internal router 412 determines the unique ID corresponds to a breadcrumb, the internal router 412 sends a breadcrumb ID to a state machine 420.

In various implementations, the breadcrumb ID may be the same as the unique ID or may be different as defined by a mapping from the index data store 416. As described in more detail below, the state machine 420 retrieves a breadcrumb from a breadcrumb data store 424 and executes each user interface action within the breadcrumb using a UI replay actuator 428. The state machine 420 may monitor the state of App A 232 to ensure that each user interface event is processed by App A 232 before moving to the next UI event.

If the internal router 412 determines that the unique ID from the URI processor 408 corresponds to an activity or data object handled by the App A handler 300, a signal is sent to an activity call creator 432. The activity call creator 432 creates a continue user activity signal specifying the activity or data object related to the link. The parameters required for creating the continue user activity signal may be obtained from the index data store 416. The continue user activity signal is passed to the App A handler 300 via a handler interface 436, which may send a continue user activity signal to the App A handler 300 as if the App A handler 300 was receiving that signal directly from the operating system.

As mentioned above, the routing library 260 traps the method called by the operating system to provide a continue user activity signal to the app. An activity handler 440 of the routing library 260 then receives the continue user activity signal. The activity handler 440 determines whether the continue user activity signal should be handled by the App A handler 300 already implemented by the developer. This determination may be based on the index data store 416. In such cases, the activity handler 440 provides the continue user activity as a pass through to the App A handler 300 via the handler interface 436.

In apps where the developer has not coded a handler such as the App A handler 300, the activity handler 440 may never transmit pass through activities and the activity call creator 432 and the handler interface 436 may be dormant. If the activity handler 440 determines that the continue user activity signal, according to the index data store 416, can be resumed using a stored breadcrumb, the breadcrumb ID is provided to the state machine 420 for execution.

So far, the aspects of the routing library 260 related to incoming deep links, whether in the form of a link or a continue user activity signal from the operating system, have been described. The routing library 260 may also implement functionality that sends activity objects and data objects to the operating system. This allows the operating system to return search results from the app.

A data indexer 460 determines which data objects of the app to index based on rules from a business rules data store 464. For example only, the data indexer 460 may respond to an app loaded signal to execute upon the app successfully running on the device. The data indexer 460 may, upon the first execution of the app, send a predetermined set of data objects to the operating system via an operating system interface 468.

For example only, with respect to data objects, the operating system interface 468 may simply be an invocation of the indexSearchableItems( )method. On subsequent loading of the app, the data indexer 460 may update the index data objects based on their continued relevancy, based on data changes made to the app, or based on rule changes from the business rules data store 464.

For example, if cuisine names are being indexed, as new cuisine names are added to the app, the data indexer 460 may add the additional cuisine names to the operating system index. Meanwhile, if the business rules data store 464 is updated to indicate that cuisine names should no longer be indexed, the data indexer 460 may delete the corresponding data objects from the operating system index.

A data store updater 472 is responsible for updating one or more data stores, including the breadcrumb data store 424, the index data store 416, and the business rules data store 464. The data store updater 472 contacts the data server 284 of FIG. 2 via a network interface 476. The network interface 476 may handle authentication and encryption so that the validity of data store updates can be confirmed.

The data store updater 472 may operate when the app incorporating the routing library 260 is first opened on a device and at subsequent periodic intervals. In addition, the data store updater 472 may perform additional updates in response to data needs, such as if a breadcrumb ID is not present in the breadcrumb data store 424.

An activity creator 480 creates activity objects to bookmark activities with the operating system. The operating system interface 468 may bookmark an activity by calling the becomeCurrent( )method on a created activity object. The activity creator 480 may respond to a view appearing, such as the viewDidAppear signal, or to some other event, such as the view loading or being about to appear.

The activity creator 480 may update activity objects as interactions with a view occur. The activity creator 480 may, therefore, trap additional methods that provide user input to a view so that the corresponding activity object can be updated. For example, as the user edits a textbox, the activity creator 480 may update the activity object after each keystroke.

In addition to creating an activity object, the activity creator 480 may indicate to the data indexer 460 that certain data objects should be indexed. These decisions may be based on rules from the business rules data store 464. For example, the activity creator 480 may create an activity object based on the user viewing a list of restaurants for a particular cuisine. Whether this activity object is created is determined by the business rules data store 464. The business rules data store 464 may also dictate that the activity creator 480 signal to the data indexer 460 that the top one or more results from a search should be indexed.

For example, if the user is viewing a set of Thai restaurants and the most relevant result is the Amarin Thai restaurant, the user may later wish to search for Amarin Thai. By indexing the Amarin Thai data object, the operating system can provide a result directly to the app for Amarin Thai. In addition, depending on how the operating system index identifies search results, a user searching within the operating system for "Thai" may see both the activity for the app related to a list of Thai restaurants as well as the specific Amarin Thai data object.

When the operating system sends a continue user activity signal related to one of the activity objects from the activity creator 480 or the data objects from the data indexer 460, a corresponding breadcrumb will be present in the breadcrumb data store 424 to reach these activity objects or data objects since the app itself was not programmed by the developer to accommodate them.

The activity objects and data objects created by the activity creator 480 and the data indexer 460 respectively are provided to the index data store 416 so that the index data store 416 is aware of which activity objects and data objects can be handled by the routing library 260 instead of being passed through the App A handler 300.

A remote indexer 484 may be instructed by the business rules data store 464 to mirror activity objects and/or data objects from the index data store 416 to a remote index. This remote index may be maintained by the provider of the routing library 260 or by a search service. Activity objects and data objects may be marked with a private identifier (or assumed private unless marked with a public identifier). This private identifier may prevent the object from being uploaded to the remote index or may prevent the object from being exposed by the remote index in public search results. This privacy indication may be provided by the developer as part of the onboarding process of the app to the developer portal and may be updated by the developer over time.

A search system 288 receives access mechanisms from the data server 284 incorporating identifiers of breadcrumbs or the breadcrumbs themselves. The search system 288 may already have information about states of interest of App A and then can associate the access mechanisms with the respective states. In other implementations, the search system 288 may crawl and scrape App A to obtain metadata for states of interest, and may follow the access mechanisms to find the content of the states.

In one use model, the user of the user device 220 performs a search for certain functionality and/or for a certain entity, such as reviews for a restaurant of interest. The user may perform this search with a standalone search app or, as shown in FIG. 2, a web search performed via the browser 228. The search system 288, as described in more detail below, provides search results to the browser 228.

These results may include a result corresponding to App A 232, and may include a link indicating a specific deep state in App A 232. If the user selects the link corresponding to App A 232, the link is forwarded to the link router 244 and then passed to the routing library 260 of App A 232. App A 232 is then controlled by the routing library 260 to display the indicated deep state using the corresponding breadcrumb.

In various implementations, the routing library 260 receives the contents of the breadcrumb from parameters encoded within the link itself. For example, the link (in this case, a URI) may include the scheme ("portal-appa://") followed by a serialized encoding of each UI event of the breadcrumb in series leading to the desired view. For example, the breadcrumb may be specified in a JSON (JavaScript Object Notation) data structure encoded using Base64.

The search system 288 is, therefore, able to provide a link that will take the user directly to relevant content within App A 232. The search system 288 may provide search results to others apps. For example, a hotels app may query the search system 288 for restaurants near the user's selected hotel and the search system 288 may provide restaurant search results to the hotels app. In the case where App A 232 is a restaurant review app, the hotels app can link directly into a deep state of App A 232 corresponding to the restaurant of interest. The search system 288 may provide the search results in the form of DVCs.

A DVC for an app or a state of an app shows additional information, beyond just the identification of the app or app state. For example, the information may include a title of the app state or a description of the app state, which may be a snippet of text from the app state. Other metadata may be provided from the app state, including images, location, number of reviews, average review, and status indicators. For example, a status indicator of "open now" or "closed"

may be applied to a business depending on whether the current time is within the operating hours of the business.

Some DVCs may emphasize information that led to the DVC being selected as a search result. For example, text within the DVC that matches a user's query may be shown in bold or italics. The DVC may also incorporate elements that allow direct actions, such as the ability to immediately call an establishment or to transition directly to a mapping app to get navigation directions to the establishment.

Other interactions with the DVC (such as tapping or clicking any other area of the DVC) may take the user to the indicated state or app. As described in more detail below, this may be accomplished by opening the relevant app or, if the app is not installed, opening a website related to the desired app state. In other implementations, an app that is not installed may be downloaded, installed, and then executed in order to reach the desired app state.

In other words, a DVC includes identifying information for the app or state as well as additional content from the app or state itself. The additional content allows the user to make a more informed choice about which result to choose, and may even allow the user to directly perform an action without having to navigate to the app state. If the action the user wants to take is to obtain information, in some circumstances the DVC itself may provide the necessary information to accomplish such action.

In various implementations, the routing library may be identical for each app with the only exception being the name of the custom scheme that the routing library will register upon installation. The scheme may be formed by concatenating text of the developer portal with the text of the app name, and may include a separator such as a hyphen or an underscore. The name of the app may change over time, but the scheme may be fixed after first being set to provide backward compatibility with older versions of the app whose routing library may only recognize the original scheme.

In various implementations, the routing library may be updated with security updates, bug fixes, and feature additions while maintaining backward compatibility. Developers, such as the developer 204, may download and incorporate the newest version of the routing library each time they release a new version of their app to the digital distribution platform 212. In some implementations, the build/compile process may automatically download the latest version of the routing library when resolving linker dependencies.

The offline analysis system 280 may need to be invoked each time the developer 204 prepares a new version of App A for the digital distribution platform 212. In addition, as the developer 204 adds more content to App A, the offline analysis system 280 may be invoked to determine the breadcrumbs needed to access that added content. Invocation of the offline analysis system 280 may be performed at the request of the developer 204 or may be performed on a periodic basis. Any updates or additions to the breadcrumbs are stored by the data server 284 and can be provided to the search system 288 so that links within search results have the most up-to-date access mechanisms.

In some implementations, the breadcrumbs may be communicated to the routing library 260 using a mechanism other than direct inclusion in the URI. For example, this may be necessary when a maximum-length link is shorter than the number of characters an encoded breadcrumb may require.

The routing library 260 may, therefore, in some implementations, download a package of breadcrumbs from the data server 284. Search results from the search system 288 or other links may then reference a unique identifier, which the routing library 260 maps to a breadcrumb. For example only, the unique identifier may be formed from a function and an entity, such as "restaurant_reviews" and "Amarin_Thai". In one specific example, the URI "portal-appa://restaurant_reviews/Amarin_Thai" may be resolved by the routing library 260 to a breadcrumb that reaches the restaurant reviews state for the Amarin Thai restaurant from a default state of App A 232. However, there is no requirement that the unique identifier be human-readable.

In other implementations, the routing library 260 may consult the data server 284 in response to receiving a deep link. By providing the unique identifier, the routing library 260 can download the necessary breadcrumb from the data server 284. In such implementations, the routing library 260 may cache breadcrumbs so that a network access isn't required to resolve deep links visited recently. Pre-caching of some or all breadcrumbs may also be performed, such as when App A 232 first executes on the user device 220.

Pre-caching may happen even earlier, such as when the developer 204 is preparing App A for distribution. In other words, the full set or a subset of the breadcrumbs may be included along with App A so that when a unique identifier is received via a link, the appropriate breadcrumb can be chosen by the routing library 260 without delay. Pre-caching may be combined with periodic verification of the breadcrumbs by the routing library 260, such as by checking a version number of the package of breadcrumbs at a periodic calendar interval, such as once a month. In other implementations, the data server 284 may send a push notification to the routing library 260 indicating that new breadcrumbs are available.

To the extent that the developer 204 had implemented some deep links within App A, a developer-implemented router (not shown) in App A 232 would receive links from the link router 244. The developer's routing code would not have registered "portal-appa://" but instead a scheme independent of the developer portal 208, such as "appa.com://". In various implementations, the developer-specified URIs may not be publicly available or may only be available to companies with an established relationship with the developer 204.

Some operating systems, including the iOS operating system, have a sandbox infrastructure to limit the extent to which an app can access resources or areas of memory beyond what has been specifically allocated to the app. Sandboxing enhances security, making it more difficult for malicious software to compromise a user system. Because the routing library 260 executes within the context of App A 232, the sandbox should pose no difficulty for interactions between the routing library 260 and the view controllers responsible for the views 268.

High-Level Flowchart

Figure 5:
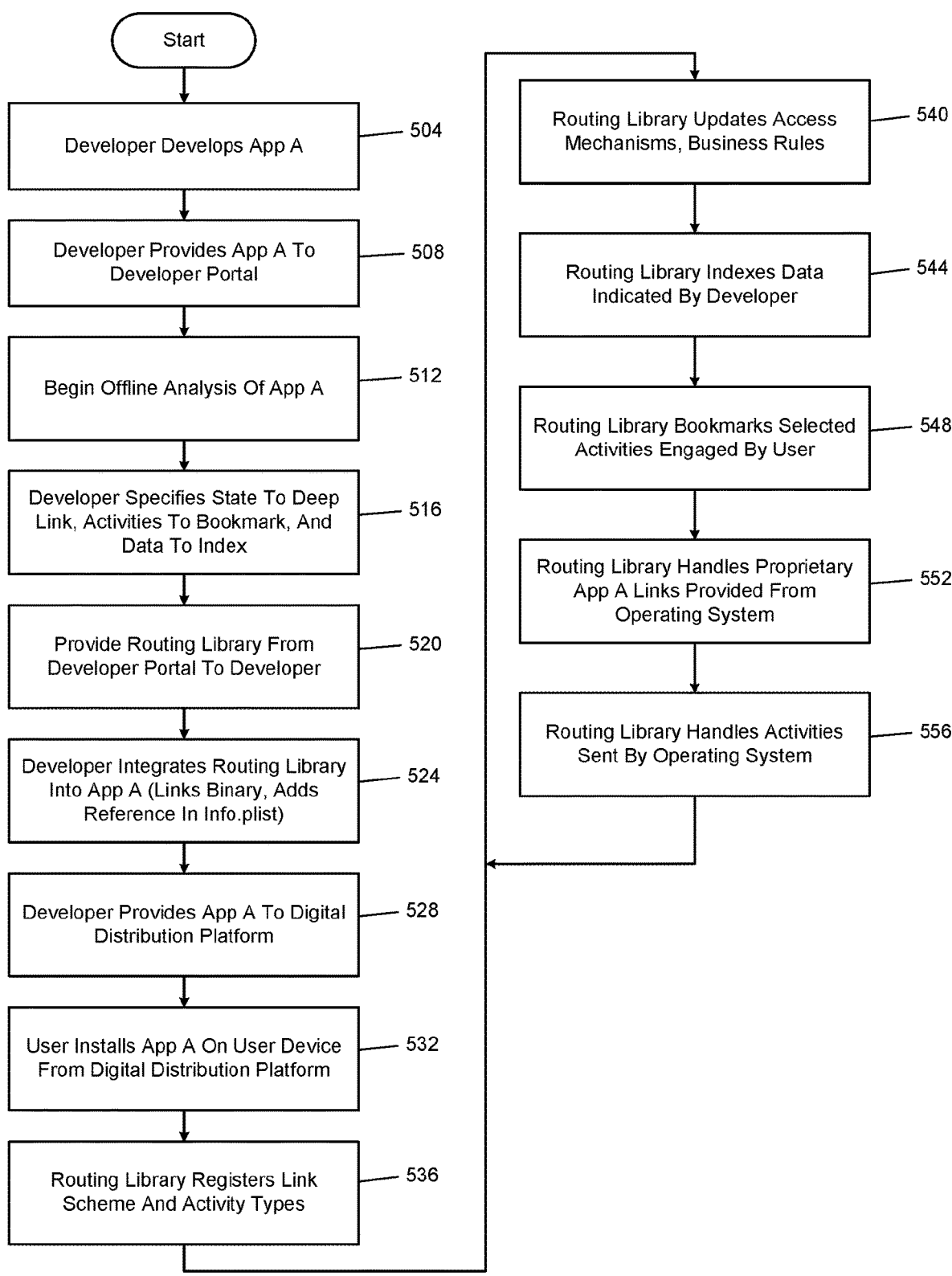
FIG. 5 is a flowchart of example overall operation of a mobile application ecosystem according to the principles of the present disclosure.

In FIG. 5, an overview of the operation of the present disclosure with respect to one developer and one app begins at 504. The developer first develops the app (referred to here as "App A"). App A may not have functionality that can expose deep links to all of its states. In addition, App A may not have indexing functionality or activity resumption functionality for some or all states. Further, any deep linking or search functionality that App A possesses may require programmer intervention to modify. As a result, the developer could benefit from the routing library described by the present invention.

At 508, the developer provides a copy of App A to the developer portal. This may be a standard build, such as what would be provided to a digital distribution platform. In fact, if App A has already been released to a digital distribution platform, the developer portal may acquire the copy of App A from the digital distribution platform. While the standard build is generally restricted to running on emulators or hardware devices, the developer could instead provide a special build of App A, such as a build tailored to a simulation environment. The simulation environment may even run on a different architecture (such as an x86 architecture) compared to the app (which may run on user device hardware based on the ARM architecture).

At 512, control begins offline analysis of App A. Offline analysis may include determining states for which deep links are already present in App A. Offline analysis may also include determining which activities can be resumed within App A in which data can be indexed by App A based on code written by the developer. For example only, offline analysis may include static and dynamic analysis of App A, which is described in more detail in U.S. application Ser. No. 14/984,642, filed Dec. 30, 2015, titled "Static Analysis and Reconstruction of Deep Link Handling and Compiled Applications," with first-named inventor Kalyan Desineni. The entire disclosure of this application is incorporated by reference.

At 516, the developer specifies business rules for App A. For example, the developer specifies to the developer portal which states of App A to provide deep link functionality for, which activities of App A to bookmark, and what data to index. The developer may navigate a copy of App A in order to specify which states to provide deep links for. For example, the developer may interact with App A in a simulator, while the offline analysis platform monitors the user interface events for later replay.

The developer may simply be asked to navigate to states of interest, without needing to understand that the user interface events are being recorded for deep linking purposes. For each state the developer navigates to, the developer may specify whether one or more activities being performed in that state should be bookmarked and may identify one or more pieces of data to index from that state. The developer may specify what metadata to include with the data being indexed, and may flag activities or data as public or private.

At 520, in parallel with offline analysis, control provides a copy of the routing library from the developer portal to the developer. At 524, the developer integrates the routing library into App A. For example, this may include adding references in a configuration file to the scheme handled by the linking capability of the routing library as well as adding the types of activities that the routing library will recognize.

In some implementations, the activities recognized by the routing library will be redundant with activities already recognized by App A, such as when App A already allows for some activity resumption or data indexing. The developer also links the binary to the App A project within the integrated development environment. In various implementations, a script may be provided to the developer to perform the incorporation actions of 524.

At 528, the developer compiles App A, which now includes the routing library, and provides App A to one or more digital distribution platforms. At 532, a user of a user device installs App A from a digital distribution platform. At 536, as part of installation, the routing library of App A registers a custom link scheme handled by the routing library as well as activity types handled by the routing library. For example, this registration may be performed by the operating system based on a configuration file, such as Info.plist.

At 540, the routing library of the now-installed application updates access mechanisms and business rules. For example, the access mechanisms may be breadcrumbs to reach certain states. The business rules identify which states should be accessed, which activities should be bookmarked, and which data should be indexed.

When the application is first run, the routing library may download a full set of access mechanisms and business rules so that no access latency is incurred when an access mechanism or business rule is needed. In other implementations, upon first being run, the routing library only downloads a subset of the access mechanisms, such as access mechanisms for the most popular states. The updates at 540 may be performed each time the app is opened or at predetermined intervals. In addition, the routing library may update access mechanisms and/or business rules if a required access mechanism (for example, a breadcrumb) is missing or if the access mechanism appears to not be working.

At 544, the routing library indexes data indicated by the developer according to the business rules. For example, when the app first loads, the routing library may index a set of data indicated by the developer. Then, as data is modified in App A, the routing library may update the operating system index based on the updated data. At 548, the routing library bookmarks selected activities engaged by the user. For example, when the user performs a search, the search criteria and filters may be bookmarked as an activity that the user can resume on that device or handoff to another device.

At 552, the routing library in App A handles proprietary App A links (indicated by the registered scheme) provided to the routing library from the operating system. At 556, the routing library handles activities sent by the operating system, including continue user activity signals. These activities may refer to bookmarked activities or to indexed data. Control then returns to 540. Although 540, 544, 548, 552, and 556 are displayed in series, they may run asynchronously and in parallel.

Routing Library Operation

Figure 6:
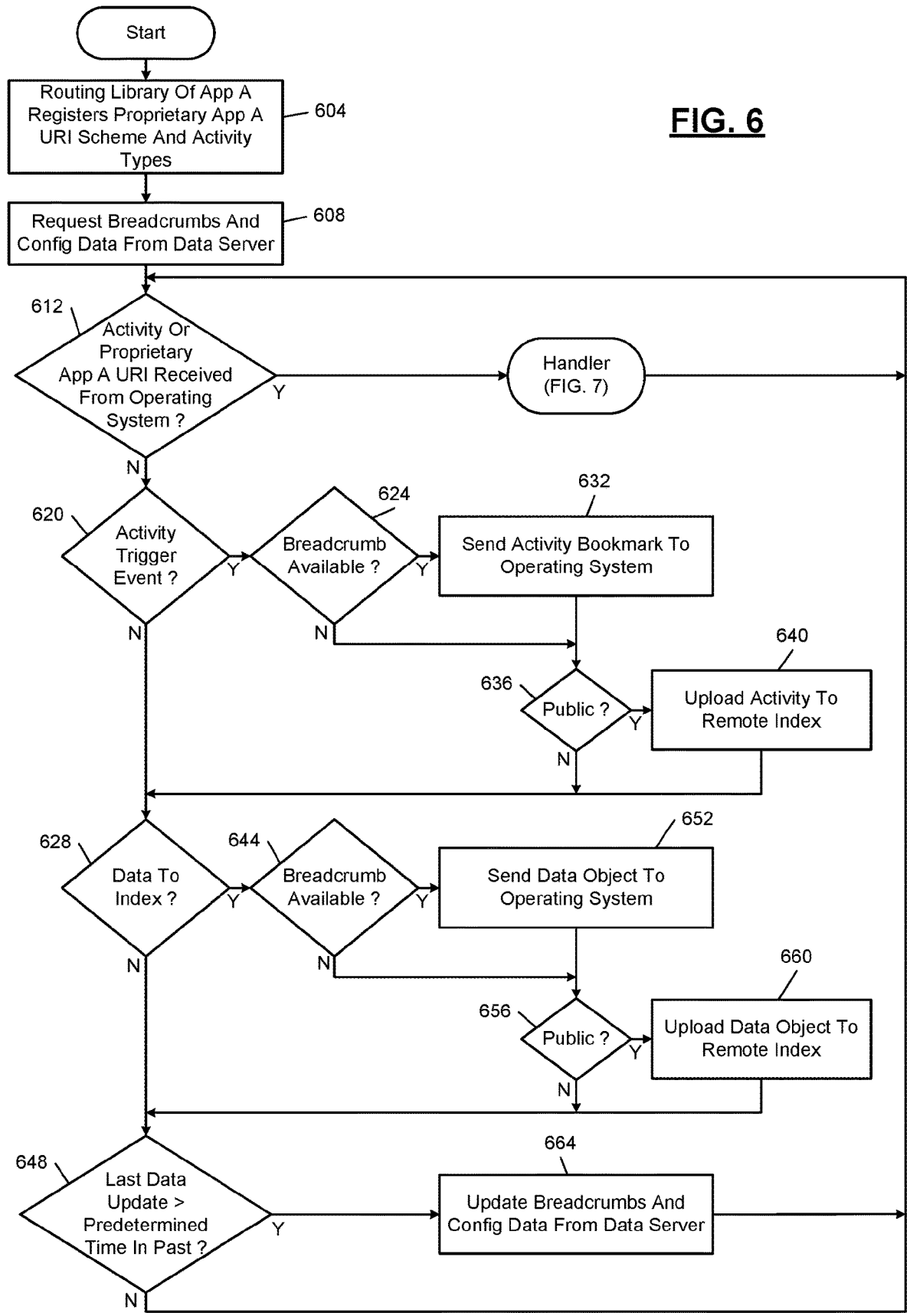
FIG. 6 is a flowchart of example operation of a routing library.

In FIG. 6, example operation of the routing library is shown. At 604, during installation of App A onto a device, the proprietary App A URI scheme and activity types in the routing library are registered. This may be performed by the operating system from a configuration file (also known as a manifest file) as part of the installation process. At 608, control requests breadcrumbs and configuration data from the data server. This may be performed upon the first execution of App A on the user device.

Figure 7:
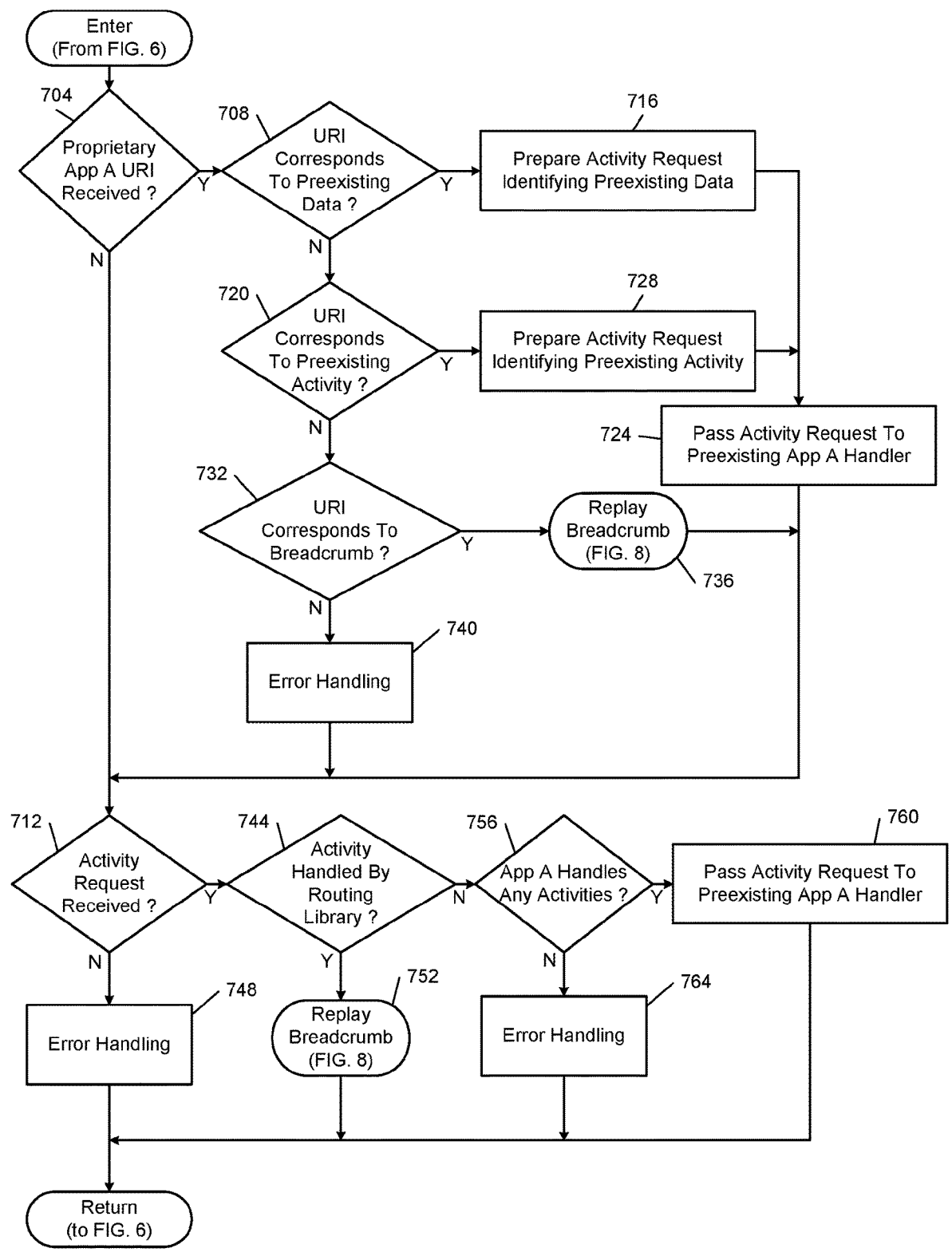
FIG. 7 is a flowchart of example operation of activity and link handling within a routing library.

At 612, control determines whether an activity or a proprietary App A URI has been received from the operating system. If so, control transfers to 616; otherwise, control transfers to 620. At 616, control invokes a handler for the activity or proprietary App A URI. For example, the handler may be implemented as shown in FIG. 7. For example only, the handler may respond to an openURL( ) call received by the operating system or from a continue user activity signal generated by the operating system. After handling the activity or proprietary App A URI, control returns to 612.

At 620, control determines whether an activity trigger event has occurred. If so, control transfers to 624; otherwise, control transfers to 628. An activity trigger event may be the loading of a state or an action performed within a state. The developer may specify which event qualifies as an activity trigger. The developer may establish business rules dictating that some states trigger an activity when the state is entered while for other states an activity is bookmarked upon some further action being performed, such as user input.

At 624, control determines whether a breadcrumb is available to return to that activity. If so, control transfers to 632; otherwise, control transfers to 636. If a breadcrumb that returns to that activity is not available, the routing library may not be able to resume that activity when requested by the operating system and therefore will not bookmark that activity. At 632, the breadcrumb is available and therefore control sends an activity object to the operating system to bookmark the activity.

At 636, control determines whether the activity has been indicated by the developers as being public. If so, control transfers to 640; otherwise, control continues at 628. At 640, the activity has been indicated as public and therefore control uploads the activity to a remote index. Control then continues at 628. In other implementations, control may upload the activity to the remote index regardless of whether the activity has been indicated as public, and instead uses the public indicator to determine whether to reveal that activity to any users of the remote index.

At 628, control determines whether data should be indexed according to business rules established by the developer. If so, control transfers to 644; otherwise, control transfers to 648. For example, when first running App A, there may be a predetermined set of data objects that the developer desires to index. Then, after certain states have been accessed, the developer may have specified that data related to those states should be indexed. For example, in a music streaming app, if the user has viewed a list of artists in a particular genre, data objects corresponding to each of the artists may be added to the operating system index.

At 644, if a breadcrumb is available for a data object the developer has indicated should be indexed, control transfers to 652; otherwise, control continues at 648. At 652, the breadcrumb to reach a state that can access that data object is available and therefore the data object is sent to the operating system. If the breadcrumb were not available, the routing library would not be able to service a request from the operating system to display the data object to a user.

While FIG. 6 shows operation of the routing library, the developer may have implemented logic within App A that will index data objects and bookmark activities, separate from the routing library. This indexing and bookmarking is not precluded by the operation of the routing library. Therefore, even when the routing library does not index the data object or bookmarking activity, App A itself may be performing that task. In order for App A to then resume the activity when instructed by the operating system, App A will have logic implemented by the developer to reach the appropriate states. This logic may include direct actuation of view controllers or may include a user interface breadcrumb similar to that used by the routing library.

Control continues from 652 to 656, where if the data object is indicated as public, control transfers to 660; otherwise, control continues at 648. At 660, control uploads the data object to the remote index and continues at 648. Again, the public identifier may be ignored at the time of uploading the data object to the remote index and instead be taken into account when determining whether to reveal the data objects to other users.

At 648, control determines whether the last data update of breadcrumbs and configuration data is more than a predetermined time in the past. If so, control transfers to 664 to update this data; otherwise, control returns to 612. Although shown as a predetermined amount of time, data updating may be performed dynamically based on how often the app is used, how often breadcrumbs or configuration data historically has changed, and/or may be based on a push signal from the data server indicating that data should be updated.

Activity/URI Handling

In FIG. 7, example routing library operation for handling activities and proprietary URIs is shown. In various implementations, the process of FIG. 7 may be called by 616 of FIG. 6. Control begins at 704, where if a proprietary App A URI has been received, control transfers to 708; otherwise, control transfers to 712.

At 708, control determines whether the URI corresponds to a preexisting data object—that is, a data object that App A was able to index and display independent of the routing library. If the URI corresponds to such a preexisting data object, control continues at 716; otherwise, control transfers to 720. At 716, the routing library will be able to use the preexisting access mechanism within App A to display a state relevant to that data object. To accomplish this, control may prepare an activity request that is similar or identical to the activity request the operating system would provide to App A in order to display a state related to that data object. Control then continues at 724, where the prepared activity request is passed to a preexisting App A handler that was written by the developer independent of the routing library. Control then continues at 712.

At 720, control determines whether the URI corresponds to a preexisting activity—that is, an activity that App A could bookmark and resume independent of the routing library. If so, control transfers to 728; otherwise, control transfers to 732. At 728, control prepares an activity request identifying that preexisting activity. The activity request may be similar or identical to a request that the operating system would provide to App A in order to resume the bookmarked activity. The control then continues at 724.

At 732, control determines whether the URI corresponds to a breadcrumb. If so, control transfers to 736; otherwise, control transfers to 740. Although referred to as a breadcrumb, the access mechanism can be another mechanism the routing library uses to navigate to a certain state. For example, the routing library may be programmed with a set of parameters allowing a specific view controller to be invoked with particular input parameters to arrive at a certain state. At 736, control replays the breadcrumb, such as using a process shown in FIG. 8. Control then continues at 712.

At 740, the proprietary App A URI cannot be passed to the preexisting App A handler and an access mechanism (such as a breadcrumb) does not exist. As a result, error handling is performed. For example, the error handling may include displaying a message to the user indicating that the link failed and directing the user to a default state of the app. Before displaying the message, control may refresh downloaded breadcrumbs to ensure that the latest breadcrumbs are available. As another example, control may attempt to find and then traverse a comparable URI, such as by querying a mapping of obsolete URIs to active URIs. Control then continues at 712.

At 712, if an activity request (such as a continue user activity method call) is received by App A (for example, by the App delegate of App A), control transfers to 744; otherwise, control transfers to 748. At 744, control determines whether the activity should be handled by the routing library. If so, control transfers to 752; otherwise, control transfers to 756.

Figure 8:
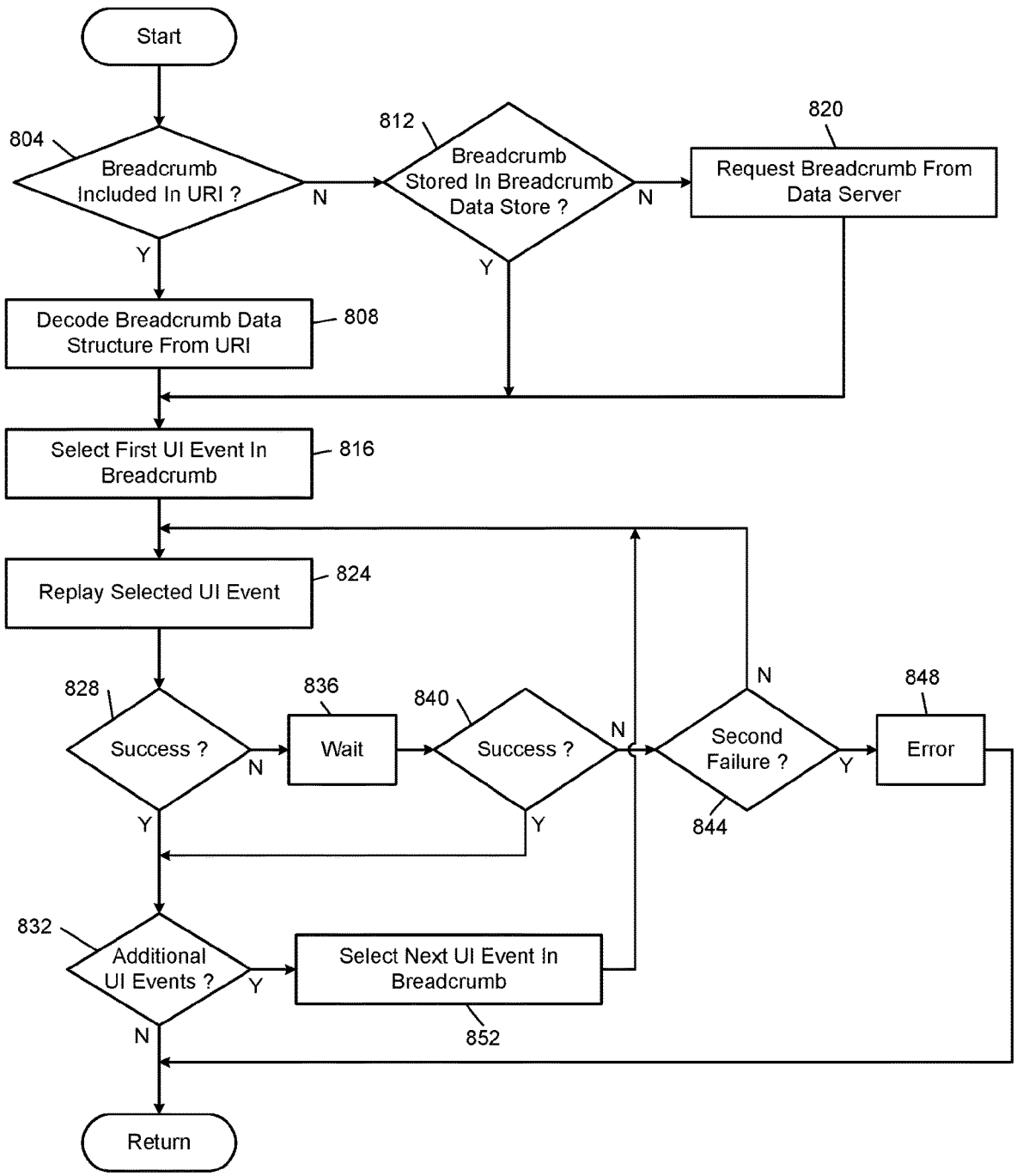
FIG. 8 is a flowchart of example traversal of a breadcrumb to reach a specified state.

At 752, the activity is handled by the routing library because the routing library bookmarked the corresponding activity or indexed the corresponding data object. The activity may be resumed by replaying a breadcrumb corresponding to the state identified by the activity request. For example, this may be performed as shown in FIG. 8. Control then returns to FIG. 6.

At 756, if the routing library is aware that App A handles at least some activity requests, control continues at 760. Otherwise, if the routing library is confident that App A is otherwise unable to handle any activities, control transfers to 764 where error handling is performed. For example, the error handling may include displaying an error message that the activity request cannot be met.

At 760, the activity request is passed through to the preexisting App A handler in the hope that the App A handler can handle the activity request. Control then returns from FIG. 7. At 748, error handling is performed because neither a proprietary App A URI has been received or an activity request has been received. Control may not be aware of what was received other than an activity request or a proprietary App A URI and therefore may not display anything to the user, instead simply taking the user to a default state of the app. Control then returns from FIG. 7.

Breadcrumb Traversal

In FIG. 8, example operation of the routing library when traversing a breadcrumb is shown. Control begins at 804, where if the breadcrumb is embedded in the URI, control transfers to 808; otherwise, control transfers to 812.

As described above, breadcrumbs that allow the routing library to navigate to certain deep states may be received in links or may be indicated by unique ID in the link. When indicated by a unique ID, the routing library may have to request the breadcrumb from a data server. In some implementations, the routing library will therefore pre-cache some or all breadcrumbs. This operation may be omitted if breadcrumbs will always be received within links.

In some implementations, certain breadcrumbs when encoded are longer than a maximum permitted length of a link. This maximum length may be dictated by a browser, by an operating system, or by some other technological or business restriction. These breadcrumbs may therefore be obtained from the data server, while shorter breadcrumbs are contained within URIs. In this way, the generator of the URI (such as a search system) prepares the URI including the breadcrumb data itself when the maximum link length will not be exceeded, while otherwise including only a unique identifier of the breadcrumb.

At 808, control decodes a data structure holding the breadcrumb from the URI and control continues at 816. At 812, since the breadcrumb was not included in the URI, control determines whether the breadcrumb is already stored in the breadcrumb data store. If so, control uses the breadcrumb from the breadcrumb data store and continues at 816; otherwise, control transfers to 820. At 820, control requests the breadcrumb from the data server, and when the breadcrumb is returned, control continues at 816.

In various implementations, the routing library acquires an initial set of breadcrumbs before one of the breadcrumbs would be indicated by a URI. For example, the routing library may be pre-packaged with the initial set of breadcrumbs or the routing library may download the initial set of breadcrumbs upon installation or first execution on the user device. The routing library may periodically (for example, via a background process) receive new breadcrumbs to supplement functionality. In some implementations, an improved user experience may result from breadcrumbs always being obtained from the data store and never retrieved from the data server. This minimizes delays in response resulting from obtaining breadcrumbs from the data server and avoids availability issues from network connectivity problems.

At 816, control selects the first UI event in the sequence specified by the breadcrumb. At 824, control replays the selected UI event from the breadcrumb. At 828, control determines whether replaying the selected UI event successfully led to the next view or updated the current view as expected. In various implementations, control may wait for a predetermined period of time before checking for success. This predetermined period of time allows the app to respond to the UI event.

In various implementations, the breadcrumb data structure may include a specified wait time, which may apply to all UI events, or may have a separate wait time for each UI event. As part of the breadcrumb determination process, the offline analysis system may detect that certain UI events take longer for an app to respond to. In such cases, the offline analysis system may indicate that additional delay periods should be implemented before replaying another UI event.

At 828, success may instead be identified when the routing library detects that a method has been called with certain parameters corresponding to the replayed event. In other words, as part of the offline analysis, the expected response to the app to a UI event may be recorded. When this expected response is seen, success may be inferred. If, at 828, the UI event appears to have been processed successfully, control transfers to 832; otherwise, control transfers to 836.

At 836, control waits for another predetermined period of time. This additional period of time may allow for unexpectedly slow response to a UI event. Control continues at 840, where control once again attempts to verify that replaying the selected UI event has successfully led to the expected behavior. If so, control continues at 832; otherwise, control transfers to 844. At 844, if the selected UI event has been replayed twice in an attempt to obtain a successful response, control transfers to 848.

At 848, an error is declared. For example, error handling may cause the app to revert to a home state and display a notification message to the user that the deep link was unsuccessful. In addition, a message may be sent to the data server indicating that the deep link was unsuccessful. Control then returns from FIG. 8. At 844, if the selected UI event has only been replayed a single time, there has not yet been a second failure, and therefore control returns to 824 to attempt to replay the selected UI event a second time.

In various implementations, success is not evaluated, and the UI events are replayed in series with the expectation that in most circumstances, the desired deep link will be reached. As a result, elements 828, 836, 840, 844, and 848 may be replaced with a simple wait step. The wait step may wait for a predetermined delay that has been empirically determined to allow the app to respond to user input. The wait step may be used in systems where UI events cannot be processed by the app as quickly as they can be replayed by the routing library. In other implementations, the wait step may involve watching for a method call resulting from the UI event. Once response of the app to the UI event has been detected, such as by watching certain method calls, control may allow the following UI event to be replayed. At 832, if there are additional UI events, control transfers to 852; otherwise, control returns from FIG. 8. At 852, control selects the next UI in the breadcrumb and returns to 824.

Search System

Figure 9:
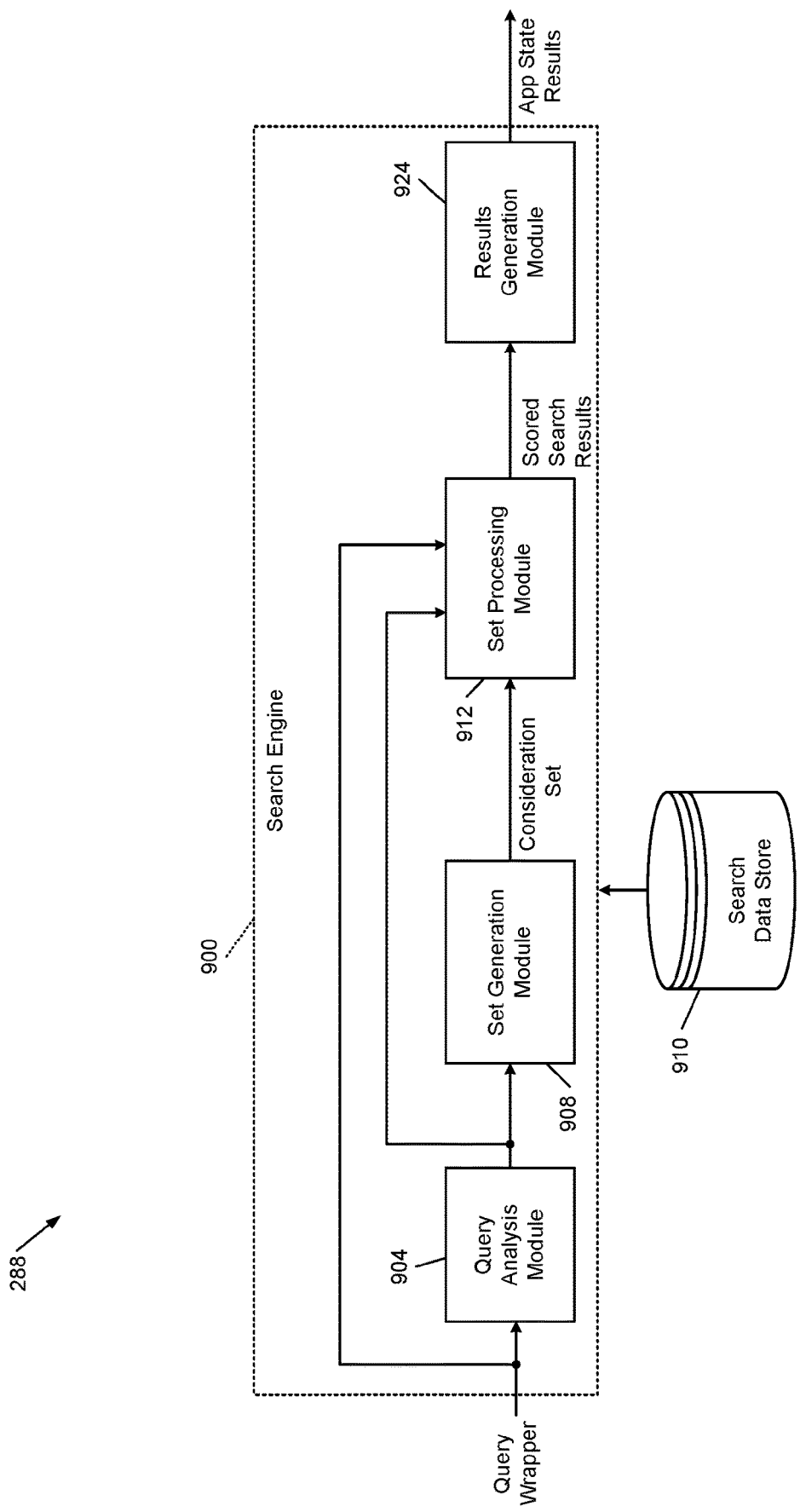
FIG. 9 is a functional block diagram of an example implementation of the search system of FIG. 2.

In FIG. 9, an example implementation of the search system 288 includes a search module 900. The search module 900 includes a query analysis module 904 that receives a query wrapper, which may take the form of a query string within a URL transmitted by the browser 228 of FIG. 2. The query analysis module 904 analyzes the text query from the query wrapper. For example, the query analysis module 904 may tokenize the query text, filter the query text, and perform word stemming, synonymization, and stop word removal. The query analysis module 904 may also analyze additional data stored within the query wrapper. The query analysis module 904 provides the tokenized query to a set generation module 908.

The set generation module 908 identifies a consideration set of application state records from a search data store 910 based on the query tokens. Application (equivalently, app) state records correspond to specific states of apps. In various implementations, the search data store 910 may also include app records. In various implementations, an app record may be stored as an app state record that simply has a predetermined value, such as null, for the specific state of the app.

App state records in the search data store 910 may be generated by crawling and scraping apps according to the principles of the present disclosure. Some or all of the contents of the records of the search data store 910 may be indexed in inverted indices. In some implementations, the set generation module 908 uses the APACHE LUCENE software library by the Apache Software Foundation to identify records from the inverted indices. The set generation module 908 may search the inverted indices to identify records containing one or more query tokens. As the set generation module 908 identifies matching records, the set generation module 908 can include the unique ID of each identified record in the consideration set. For example, the set generation module 908 may compare query terms to an app state name and app attributes (such as a text description and user reviews) of an app state record.

Further, in some implementations, the set generation module 908 may determine an initial score of the record with respect to the search query. The initial score may indicate how well the contents of the record matched the query. For example, the initial score may be a function of term frequency-inverse document frequency (TF-IDF) values of the respective query terms.

A set processing module 912 receives unique IDs of app state records identified by the set generation module 908 and determines a result score for some or all of the IDs. A result score indicates the relevance of an app state with respect to the tokenized query and context parameters. In various implementations, a higher score indicates a greater perceived relevance.

For example, other items in the query wrapper may act as context parameters. Geolocation data may limit the score of (or simply remove altogether) apps that are not pertinent to the location of the user device. A blacklist in the query wrapper may cause the set processing module 912 to remove app records and/or app state records from the consideration set that match the criteria in the blacklist, or to set their score to a null value, such as zero.

The set processing module 912 may generate a result score based on one or more scoring features, such as record scoring features, query scoring features, and record-query scoring features. Example record scoring features may be based on measurements associated with the record, such as how often the record is retrieved during searches and how often links generated based on the record are selected by a user. Query scoring features may include, but are not limited to, the number of words in the search query, the popularity of the search query, and the expected frequency of the words in the search query. Record-query scoring features may include parameters that indicate how well the terms of the search query match the terms of the record indicated by the corresponding ID.

The set processing module 912 may include one or more machine-learned models (such as a supervised learning model) configured to receive one or more scoring features. The one or more machine-learned models may generate result scores based on at least one of the record scoring features, the query scoring features, and the record-query scoring features.

For example, the set processing module 912 may pair the search query with each app state ID and calculate a vector of features for each {query, ID} pair. The vector of features may include one or more record scoring features, one or more query scoring features, and one or more record-query scoring features. In some implementations, the set processing module 912 normalizes the scoring features in the feature vector. The set processing module 912 can set non-pertinent features to a null value or zero.

The set processing module 912 may then input the feature vector for one of the app state IDs into a machine-learned regression model to calculate a result score for the ID. In some examples, the machine-learned regression model may include a set of decision trees (such as gradient-boosted decision trees). Additionally or alternatively, the machine-learned regression model may include a logistic probability formula. In some implementations, the machine-learned task can be framed as a semi-supervised learning task, where a minority of the training data is labeled with human-curated scores and the rest are used without human labels.

The machine-learned model outputs a result score of the ID. The set processing module 912 can calculate result scores for each of the IDs that the set processing module 912 receives. The set processing module 912 associates the result scores with the respective IDs and outputs the most relevant scored IDs.

A results generation module 924 may choose specific access mechanisms from the application records and app state records chosen by the set processing module 912. The results generation module 924 then prepares a results set to return to the user device. Although called "app state results" here, some of the access mechanisms may correspond to a default state (such as a home page) of an app—these may be a special case of an app state record or may be an app record.

The results generation module 924 may select an access mechanism for an app state record based on whether the app is installed on the device. If the app is installed, an access mechanism that opens the app directly to the specified state is selected. Meanwhile, if the app is not installed, a selected access mechanism first downloads and installs the app, such as via a script, before opening the app to the specified state. Opening the app to the specified state may include a single command or data structure (such as an intent in the ANDROID operating system) that directly actuates the specified state. For other apps, a script or other sequence may be used to open the app to a certain state (such as a home, or default, state) and then navigate to the specified state.

The results generation module 924 may generate or modify access mechanisms based on the operating system identity and version for the user device to which the results are being transmitted. For example, a script to download, install, open, and navigate to a designated state may be fully formed for a specific operating system by the results generation module 924.

If the results generation module 924 determines that none of the native access mechanisms are likely to be compatible with the user device, the search module 900 may send a web access mechanism to the user device. If no web access mechanism is available, or would be incompatible with the user device for some reason (for example, if the web access mechanism relies on the JAVA programming language, which is not installed on the user device), the results generation module 924 may omit the result.

Server-Side Control

Figure 10:
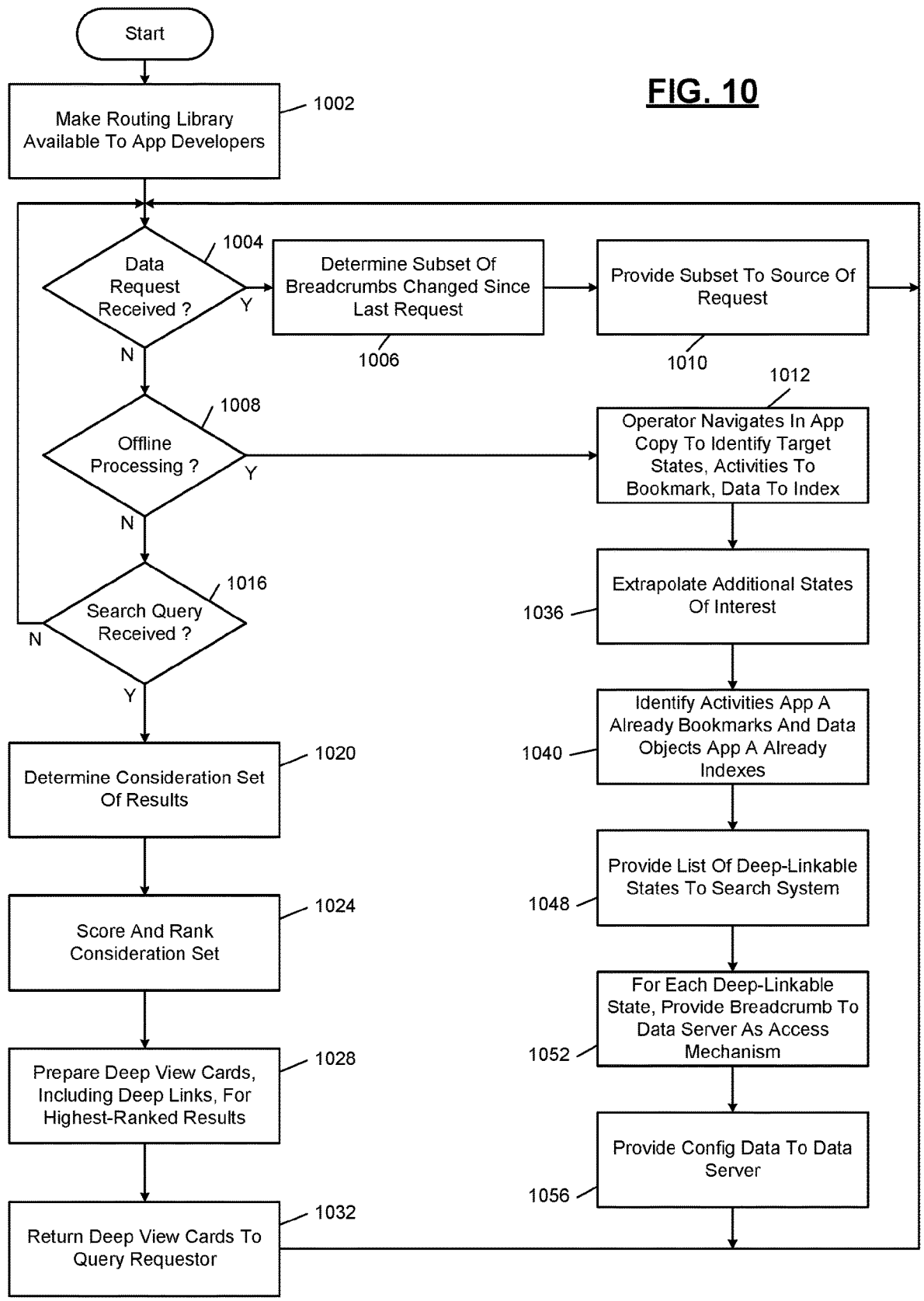
FIG. 10 is a flowchart of example operation of deep link creation and provision to user devices according to the principles of the present disclosure.

In FIG. 10, operation of server-side components may be performed within a single device or may be performed across the developer portal 208, the offline analysis system 280, the data server 284, and the search system 288 of FIG. 2. In various implementations, the developer portal 208, the data server 284, and the search system 288 may be under the control of the same entity. The offline analysis system 280 may employ operators that facilitate static analysis and/or dynamic analysis to ensure that accurate and complete parameters are extracted from each app.

Control begins at 1002, where the routing library is made available to app developers. Over time, the routing library may be updated, and the most up-to-date version may be the only one available to app developers. At 1004, if a request for a breadcrumb has been received, control transfers to 1006; otherwise, control transfers to 1008. At 1006, control determines a subset of the breadcrumbs that has changed since the last request was received from the requester. This subset can then be provided at 1010 to bring the data up-to-date at the source of the request. Control then returns to 1004.

At 1008, if offline processing of an app has been initiated, control transfers to 1012; otherwise, control transfers to 1016. At 1016, if a search query has been received from a search system, control transfers to 1020; otherwise, control returns to 1004. At 1020, control determines a consideration set of results corresponding to the search query. This consideration set may include apps that are open to the search query as well as specific states (deep states) of apps that are relevant to the search query.

At 1024, control scores the elements in the consideration set based on how closely they match the understood intent of the search query. The scored results can then be ranked from most relevant to least relevant. At 1028, the highest-ranked results are formatted as deep view cards associated with deep links to the specific states within the results. At 1032, control returns the deep view cards to the requestor of the query.

The deep view cards may not be fully rendered, and instead include images, text, and instructions on how to render the deep view cards for particular screen sizes, orientations, and other requirements of the requesting application or operating system. For apps where the deep links are serviced by a routing library according to the principles of the present disclosure, an access mechanism returned along with the corresponding search result may include a URI with an encoded data structure.

The encoded data structure may include the breadcrumb necessary to invoke that specific state from within the app. The URI, being a string, includes a serialized version of that data structure and is prefixed with a scheme. The scheme, such as "portal-appa://", will cause the URI to be forwarded to and recognized by the routing library of the app. Control then returns to 1004.

At 1012, control runs App A, such as in a simulator. While App A is running, control monitors UI events resulting from the operator's usage of App A. At 1036, control allows an operator to interact with App A to reach a deep state of interest, recording each UI interaction to form a breadcrumb. In various implementations, control may monitor how long it takes App A to respond to certain UI events. These response times, or delays based on the response times, may be encoded in the breadcrumb along with the corresponding UI events. For example, some operations may require App A to obtain data from a server, incurring network communication delays. When replaying the UI events in the breadcrumb, there should be a longer delay after the UI event leading to network access before the next UI event is replayed. At 1040, if there are additional deep states of interest, control returns to 1036; otherwise, control continues at 1044.

At 1044, control determines states that are parallel to the states identified by the operator. For example, if the operator selects a link from a list of similar-looking items, and the selected link leads to a state of interest, control may assume that the other items in the list are also of interest. These parallel states, and the breadcrumbs used to reach them (in the list example, the breadcrumbs would differ only in the last UI event), are added to the list of deep-linkable states.

In various implementations, App A may be exercised using a crawling algorithm to reach some or all deep states of App A. For additional information regarding crawling, see U.S. patent application Ser. No. 14/849,540, filed Sep. 9, 2015, titled "Unguided Application Crawling Architecture," with first-named inventor Kalyan Desineni. The entire disclosure of this application is incorporated by reference.

At 1048, control provides a list of deep-linkable states to a search system for indexing. At 1052, for each deep-linkable state, control provides a data structure containing the breadcrumb to the data server to be used in a URI as an access mechanism to access the deep state. Control then returns to 1004.

At 1012, an operator interacts with a copy of the app, such as in a simulator, to navigate to states of interest. In some implementations, the operator navigates to states of interest designated by the developer; in other implementations, the developer herself navigates to states of interest. User interface events required to reach various states are recorded such as described in FIG. 12.

Figure 13:
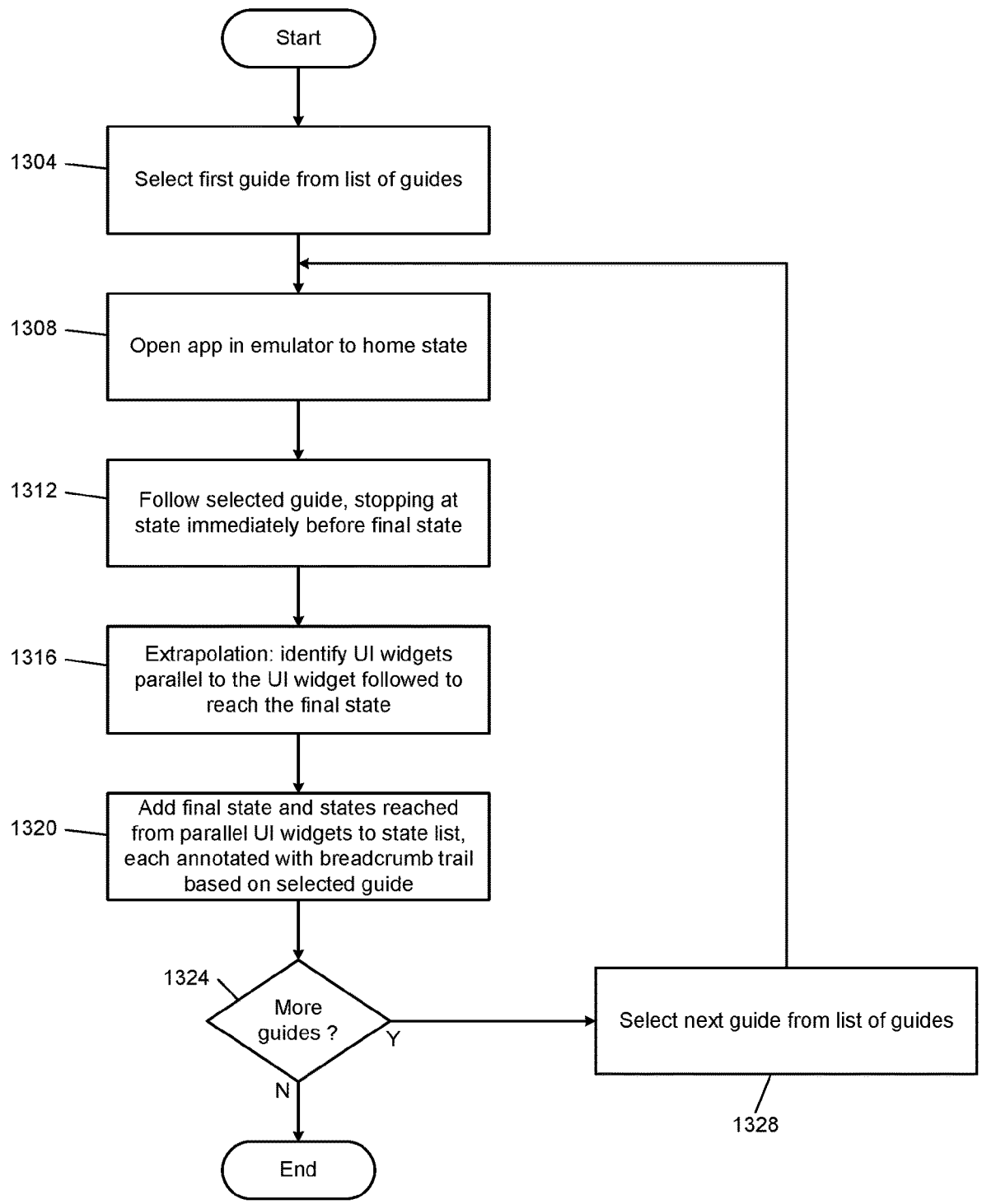
FIG. 13 is a flowchart of extrapolation as part of offline analysis to identify additional states of interest.

Control continues at 1040, where control may extrapolate additional states of interest from the operator-identified states of interest. Example operation for extrapolation is shown in FIG. 13. At 1012, while the operator is identifying states of interest, the operator may also be tagging states as activities to be bookmarked and may be identifying data within the states as data objects to index.

Control continues at 1056, where configuration parameters established by the operator are transmitted to the data server. For example, configuration parameters may be business rules specifying which states should be deep linked which states should be bookmarked as activities, and what data should be indexed.

Offline Analysis

Figure 11:
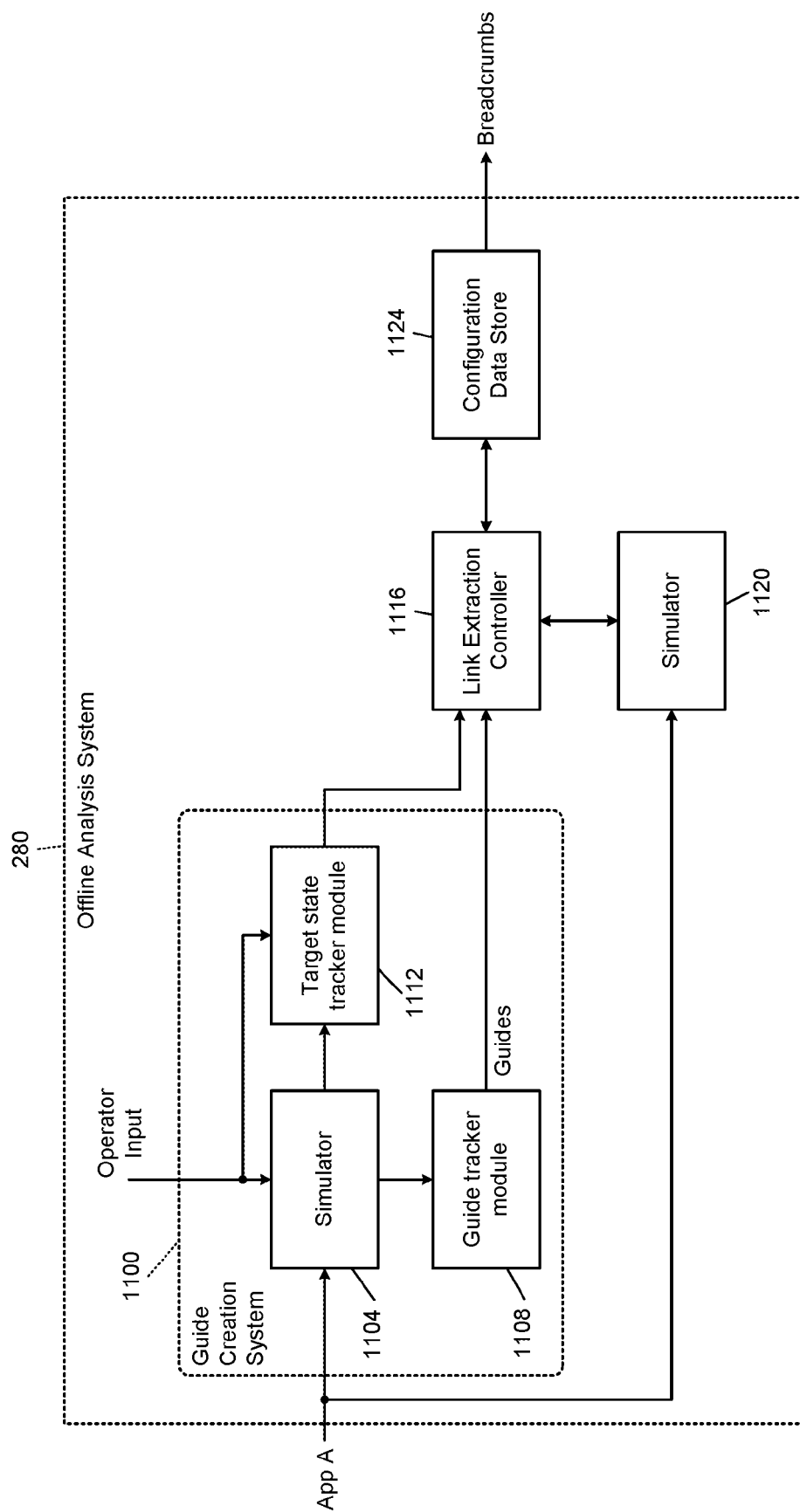
FIG. 11 is a functional block diagram of an example implementation of an offline analysis system.

In FIG. 11, an example implementation of the offline analysis system 280 includes a guide creation system 1100 that allows for operator interaction with an app of interest (such as App A). The guide creation system 1100 allows an operator to specify which states of an app should be deep-linkable and may use input from the operator to determine how to reach those deep states. In various implementations, the operator is an administrator of the offline analysis system 280, acting on standard operating procedures for offline processing of an app or on instructions from a developer of the app. Additionally or alternatively, an agent of the app developer may act as the operator. The agent may specify which states or types of states should be made accessible as deep states.

After the initial offline analysis, the agent may use the developer portal 208 to request that additional states of the app be added as deep states and request that existing deep-linked states be removed. This may be done via the developer portal 208 with no need for the agent to modify code of the app or even request assistance from the app's software developers. In other words, marketing personnel or user experience designers may themselves control the scope of the deep linking within the app, without even releasing a new version of the app. For added states, the offline analysis system 280 will re-process the app to determine the breadcrumbs to the added states.

For an app being processed by the offline analysis system 280, the operator controls a copy of the app of interest executing within a simulator 1104. In various other implementations, the app of interest may be installed on a physical device or executed in an emulation environment. In various implementations, the simulator 1104 may be instantiated at a cloud hosting operator that may provide compute facilities within which to execute emulator/simulator code or that may directly provide emulators or simulators for one or more mobile device operating systems. For more information, see U.S. patent application Ser. No. 14/868,294, filed Sep. 28, 2015, titled "Operator-Guided Application Crawling Architecture," with first-named inventor Kalyan Desineni. The entire disclosure of this application is incorporated by reference.

In some implementations, a physical device running the operating system may be used instead of the simulator 1104, such as for an operating system that does not have a suitable simulator or emulator. The physical device may be connected to the guide creation system 1100 using a wireless or wired interface, such as USB (universal serial bus). A root-level control application may be installed on the physical device to track user input. Installing the root-level application may require bypassing security limitations of the firmware or operating system regarding privileges of installed apps and may require that the device be jailbroken.

Jailbreaking involves bypassing or removing various software restrictions imposed by the operating system and/or device firmware, and may be accomplished using a privilege escalation technique. The jailbroken device may be further modified with pre-installed and specific settings that enable the techniques of the present disclosure, such as recording UI interactions. The simulator 1104 is essentially already jailbroken. However, the simulator 1104 may also be modified to allow for better control, such as to more easily allow recording UI interactions.

The operator's interaction with the app may be recorded to form a guide indicating how a state is reached. This guide defines the breadcrumb used to reach the end state, and subsets of the guide define the breadcrumbs for intermediate states. The guide may also be used to infer other states of interest and determine breadcrumbs leading to those states. Each UI event may be associated with a specific UI element, identified according to a predetermined rubric by a unique ID.

For example, the unique ID may be dictated by how the UI elements are programmatically created when rendering the view. In other implementations, the unique ID may be dictated by how the UI elements are actually seen, with the UI elements numbered in increasing order from left to right and top to bottom. In other implementations, x-y coordinates may be used to identify the location of the user interaction, or the boundaries of the UI element actuated, or a center of the UI element actuated even if the operator's action was off-center.

In various implementations, static analysis may be used to analyze the UI elements of various states of the app. Static analysis involves analyzing the code of the app without making observations of the app being executed. In some implementations, a static analyzer (not shown) may identify the UI elements of each view and assign unique identifiers to each UI element within a view. Then, dynamic analysis would have a predetermined nomenclature when referring to user interactions with any UI elements. For example, static analysis may be performed with a disassembler and debugger implemented by the IDA Pro software from Hex-Rays SA.

Additionally or alternatively, the static analyzer may analyze the methods and views of an app to determine how best to instrument the app. With this information, the dynamic analyzer can hook to the correct methods and listen for the correct events to accurately track user interaction with the app and discard method calls unrelated to user interaction. For more information on static analysis, see U.S. patent application Ser. No. 14/843,929, filed Sep. 2, 2015, titled "Static Analysis-Assisted Dynamic Application Crawling Architecture," with first-named inventor Kalyan Desineni. The entire disclosure of this application is incorporated by reference.

While the app is running in the simulator 1104, the guide creation system 1100 may monitor the messaging queue of the simulator 1104 (or of the actual operating system when executing in an emulator or physical device), listening for messages indicative of user manipulation of the app. Such manipulation includes, for example, clicking, pressing, pinching, or swiping of the user interface.

In addition to capturing a unique identifier for each UI element the operator interacts with, the guide creation system 1100 may also extract the type of each element according to the defined types specified by the operating system, and further extract the identity of the associated view controller.

For example, the following methods may be hooked, such as by using method swizzling:
(void)sendEvent:(UIEvent *)event method in the UIApplication class
(void)sendAction:(SEL)action to:(id)target forEvent:(UIEvent *)event in UIControl class
(void)viewDidAppear:(BOOL)animated for all the controllers that were loaded A handler may be implemented to record each type of UI element. As an example, code for recording a button press can be implemented as follows:

```
-(void)sendEvent:(UIEvent *)event
{
  for (UITouch *touch in event.allTouches)
  {
    if (touch.phase == UITouchPhaseBegan)
    {
      if ([touch.view isKindOfClass:[UIButton class]]) {
        NSLog(@"UIButton:id:{%@}", [((UIButton *)touch.view) currentTitle]);
      }
    }
  }
}
```

Other types of UI elements may be recorded by similar handler code. In various implementations, after hooking the objc_msgSend function, a guide tracker 1108 may listen to the AppDelegate class and the (BOOL) application:(id) application ~didFinishLaunchingWith Options: ~(NSDictionary *)launchOptions method. Further, the guide tracker 1108 may dynamically create listeners for controllers.

Instead of trying to exhaustively discover every state of an app through an unguided crawl of the app, the operator can help focus the analysis on the states for which deep links are desired—generally, the most interesting or important states. The operator may begin at a home state of the app and progress to one state of interest for each category of states for which deep linking is desired. The offline analysis system 280 may then extrapolate to find similar/parallel actions, each of which may correspond to another state of interest. These parallel states can be added to a state list that defines which states will have corresponding breadcrumbs stored.

For example, if the app includes information about restaurants, the operator may browse to a state that lists restaurants, and then select one of the restaurants. The operator may stop after finding a state that shows details about a first restaurant. Based on the series of actions taken by the operator during browsing, the offline analysis system 280 can find other restaurant detail states that could have been reached in a similar way.

For example, after selecting a restaurant item with a certain layout and certain properties (e.g. an image with property X next to a text box with property Y) from a list, the offline analysis system 280 may detect multiple additional restaurant items (that have the same layout and/or properties) within that view, which the operator could have selected. It may then predict that selecting the other restaurant listings will result in finding additional restaurant info states. For additional information about extrapolation, see U.S. patent application Ser. No. 14/869,127, filed Sep. 29, 2015, titled "State Extrapolation for Automated and Semi-Automated Crawling Architecture," with first-named inventor Kalyan Desineni. The entire disclosure of this application is incorporated by reference.

Within the guide creation system 1100, the guide tracker 1108 records operator interaction with the app in the simulator 1104 to create operator-specified guides. For example, a guide may include each user interface interaction performed by the operator, beginning at the home (or, default) state of the app. In various implementations, a target state tracker 1112 may allow the operator to flag a state currently visible in the simulator 1104 as a state of interest. For example, the target state tracker 1112 may provide a user interface element (such as a button) within the simulator 1104 or as part of software through which the operator controls the simulator 1104.

For each state of interest, a link extraction controller 1116 generates a breadcrumb specifying a sequence of UI events that leads to the state of interest. The link extraction controller 1116 is aware of states that are of interest to the operator, either explicitly (such as via the target state tracker 1112) or implicitly (such as via the guide tracker 1108). The link extraction controller 1116 may attempt to identify similar states—for example, states that are reached using similar UI (user interface) elements.

Target states may be explicitly identified by the operator using the target state tracker 1112. If target states are not specified by the operator, the link extraction controller 1116 may assume that the final state reached when an operator is creating a guide is the target state. Alternatively, the link extraction controller 1116 may make the assumption that every state the operator navigated to should be a target state.

A deduplication procedure may be used to detect when the operator has browsed in a loop, thus avoiding recording duplicative and/or non-shortest-path guides. Deduplication may be less necessary if the operator is explicitly marking target states.

The link extraction controller 1116 operates a simulator 1120, which, as described above, could instead be an emulator or a physical device. For scale, multiple emulators, simulators, and/or physical devices may be controlled by the link extraction controller 1116 to analyze the same or different applications. As an example only, a bank of physical smailphones may all be connected via USB to an interface card that is controlled by the link extraction controller 1116. Simply for ease of illustration, a single simulator (the simulator 1120) is shown in FIG. 4. In various implementations, the simulator 1120 and the simulator 1104 may be a single simulator shared by the guide creation system 1100 and the link extraction controller 1116.

The application of interest is executed within the simulator 1120. In various implementations, the app executed by the simulator 1120 may be supplemented with a routing library, such as is described in FIG. 3A or FIG. 3B. With the routing library, the link extraction controller 1116 can cause the app in the simulator 1120 to replay UI events to follow guides and identify additional states of interest. In other implementations, because the app in the simulator 1120 does not need to be a publicly-distributed version of the app, an accessibility or automation framework may be used to perform UI control. The routing library may be reserved for the version of the app that is publicly distributed.

The link extraction controller 1116 identifies states of interest corresponding to each of the guides specified by the guide tracker 1108. In order to reach a state within the app, the link extraction controller 1116 sends the shortest path specified by the guide tracker 1108 to the simulator 1120 to be replayed. The link extraction controller 1116 identifies states of interest corresponding to each of the guides specified by the guide tracker 1108.

In various implementations, the offline analysis system 280 may include a scraper (not shown) that extracts content from each state of interest. The content may include text, images, and metadata, such as location, formatting, interface hints, etc. This content may be used by the search system 288 of FIG. 2 to determine which deep states of the app are relevant to a search query. In other implementations, the search system 288 may crawl and scrape the app separately, but may use the breadcrumbs from the offline analysis system 280 to navigate to the various states.

If there are UI fields into which text needs to be entered, the operator may identify to the guide creation system 1100 what types of textual input need to be entered. The types could be, for example, city names, cuisine names, etc. The link extraction controller 1116 then consults a knowledge base to get a list of possible values of such types (for cities, the list might include "Seattle," "San Jose," etc.) and then replay each one of these values into the textual input field.

The link extraction controller 1116 may detect that a potential state of interest has already been reached by following a different breadcrumb. The link extraction controller 1116 may then select one of the breadcrumbs to associate with that state. For example, the breadcrumb having the fewest number of UI events may be selected. Alternatively, the breadcrumb having the fewest view changes may be selected, and total number of UI events may be used as a tiebreaker.

To identify that a state has already been reached, the link extraction controller 1116 may store a fingerprint for each state along with the breadcrumb. The fingerprint may be a reduced representation of the components of a state. For example, a representation of visible objects may be created, such as by enumerating the objects in an XML data structure and then computing a mathematical hash (such as with MD5) of the data structure. The hash is then the fingerprint, and if the hash of a new state matches a hash of an existing state, the states are considered to be the same.

As the link extraction controller 1116 assembles the set of states of interest, the link extraction controller 1116 may store an identifier of the state into a configuration data store 1124. For each state of interest, the link extraction controller 1116 determines a breadcrumb to reach that state and stores the breadcrumb in the configuration data store 1124. In addition, content or a fingerprint from states is stored in the configuration data store 1124. Data from the configuration data store 1124 may be provided to the search system 288 of FIG. 2.

Breadcrumb Creation

Figure 12:
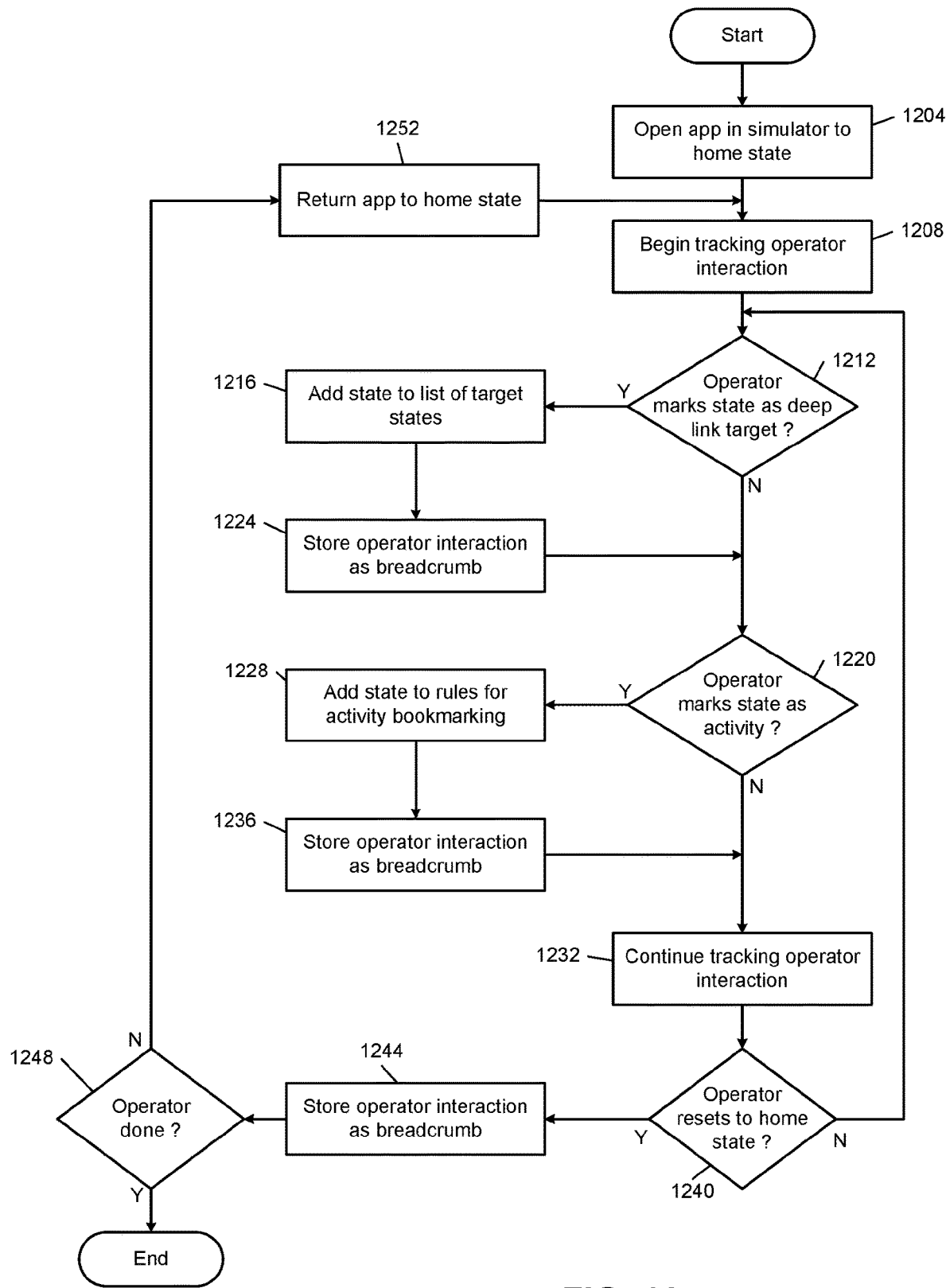
FIG. 12 is a flowchart of example operation of breadcrumb creation for an app as part of offline analysis.

In FIG. 12, example operation of breadcrumb creation by an operator begins at 1204, where control opens the subject app in an emulator or simulator to the home state of the app. At 1208, control begins tracking user interaction with the app, including tracking the user interface elements with which the operator interacts.

At 1212, if the operator marks the current state as a deep link target, control transfers to 1216; otherwise, control transfers to 1220. At 1216, the state is added to a list of target states and control continues at 1224. At 1224, control stores the operator interaction leading to the present state as a breadcrumb. Control continues at 1220. At 1220, if the operator marks the state as an activity for bookmarking purposes, control transfers to 1228; otherwise, control transfers to 1232.

At 1228, control adds the state to the rules for activity bookmarking so that when the state is encountered by a user, an activity corresponding to that state is bookmarked by sending an activity object to the operating system. Control continues at 1236, where the operator interaction leading to the present state is stored as a breadcrumb. If the breadcrumb was already stored at 1224 for the present state, an additional copy of the breadcrumb may be omitted from storage. Control continues at 1232.

At 1232, control continues tracking operator interaction with the app. At 1240, control determines whether the operator has instructed the app to reset to a home state of the app. If so, control transfers to 1244; otherwise, control returns to 1212. Resetting the home state may be accomplished by a user interface element belonging to the simulator within which the app is operating. In other limitations, the app itself may have a mechanism for returning to the home state and this is recognized by 1240 as well. By resetting to the home state, the operator indicates that a new set of user interface events should be tracked to lead to another state of interest.

At 1244, if the present state was not already marked as a deep link target, control stores the operator interaction leading to the present state as a breadcrumb and adds the present state to the list of target states. Control continues at 1248, where if the operator is done, control ends. Otherwise, control returns to 1208.

Breadcrumb Extrapolation

Referring to FIG. 13, the operator may have established a series of breadcrumbs but not labeled any particular states as target states. For example, in some implementations, the operator may not be presented with an option to designate target states. However, operator-created breadcrumbs generally begin at a home state and end at a terminal (or, final) state. This final state may be assumed to be the state of interest for deep-linking. In other words, only terminal states are assumed to be target states. In other implementations, each state encountered along a breadcrumb is assumed to be a target state.

For example, when an operator is creating breadcrumbs for a restaurant review application, the operator may create one breadcrumb by navigating from the home state to a state containing restaurant information and reviews. This would be assumed to be a desired target state, and the link extraction controller would attempt to find additional states that have similar data for scraping.

Control begins at 1304, where a first breadcrumb from a list of operator-created breadcrumbs is selected. At 1308, control opens the app to a home state in an emulator. At 1312, control follows the selected breadcrumb, stopping in the state immediately before the final state. At 1316, control performs extrapolation to identify states similar to the final state. For example, control identifies UI widgets parallel to the UI widget that, when followed according to the selected breadcrumb, will reach the final state.

At 1320, control adds the final state, as well as states reached from UI widgets identified as parallel, to a state list. Each of the added states is annotated with a breadcrumb based on the selected breadcrumb. The breadcrumb for the states other than the final state will diverge from the breadcrumb for the final state at the final UI event of each breadcrumb. At 1324, control determines whether additional breadcrumbs are present in the list of breadcrumbs. If so, control transfers to 1328; otherwise, control ends. At 1328, control selects the next breadcrumb from the list of breadcrumbs and returns to 1308.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

What is claimed is:

1. An electronic device comprising:
   a processor; and
   a memory electrically connected to the processor,
   wherein the memory stores instructions which, when executed, cause the processor to install a first application on the electronic device, the first application comprising:
      a routing library configured to register a link scheme with an operating system of the electronic device, and
      a handler configured to resume an activity of the first application in response to a request from the routing library, and
   wherein the link scheme comprises a scheme providing access to an internal state of the first application.

2. The electronic device of claim 1, wherein the routing library is further configured to:
   install a business rule specifying a state of the first application that is to be accessible by the handler.

3. The electronic device of claim 2, wherein the routing library is further configured to:
   install a user interface (UI) event sequence to reach the specified state of the first application that is to be accessible by the handler.

4. The electronic device of claim 3, wherein the routing library is further configured to:
   download one or more UI event sequences each time the first application is opened.

5. The electronic device of claim 4, wherein the link is received as a part of a search result from a second application of the electronic device.

6. The electronic device of claim 5, wherein the link allows a user of the second application access to an internal state of the first application in response to selection of the search result.

7. The electronic device of claim 3, wherein the routing library is further configured to:
   download one or more UI event sequences at predetermined intervals.

8. The electronic device of claim 1, wherein the routing library is further configured to:

receive a link from the operating system, wherein the link identifies a first activity;

generate a first resumption request based on parameters corresponding to the first activity; and transmit the first resumption request to the handler.

9. The electronic device of claim 1, wherein registering the link scheme with the operating system comprises registering a uniform resource identifier (URI) template with the operating system upon installation of the first application.

10. The electronic device of claim 1, wherein the link scheme is generated using at least one of a simulator or an emulator.

11. A method providing access to a state of an application on an electronic device, comprising:

installing, using at least one processor of the electronic device, a first application on the electronic device;

registering, using a routing library of the first application executed by the at least one processor, a link scheme with an operating system of the electronic device; and resuming, using a handler of the first application, an activity of the first application in response to a request from the routing library, wherein the link scheme comprises a scheme providing access to an internal state of the first application.

12. The method of claim 11, wherein the method further comprises:

installing a business rule specifying a state of the first application that is to be accessible by the handler.

13. The method of claim 12, wherein the method further comprises:

installing a user interface (UI) event sequence to reach the specified state of the application that is to be accessible by the handler.

14. The method of claim 13, wherein the method further comprises:

downloading one or more UI event sequences each time the first application is opened.

15. The method of claim 13, wherein the method further comprises:

downloading one or more UI event sequences at predetermined intervals.

16. The method of claim 11, wherein the method further comprises:

receiving a link from the operating system, wherein the link identifies a first activity;

generating a first resumption request based on parameters corresponding to the first activity; and transmitting the first resumption request to the handler.

17. The method of claim 16, wherein the link is received as a part of a search result from a second application of the electronic device.

18. The method of claim 11, wherein the registering of the link scheme with the operating system comprises registering a uniform resource identifier (URI) template with the operating system upon installation of the first application.

19. The method of claim 11, wherein the link scheme is generated using at least one of a simulator or an emulator.

20. A non-transitory computer readable recording medium having a program recorded thereon, the program implementing a method comprising:

installing a first application on an electronic device;

registering, using a routing library of the first application, a link scheme with an operating system of the electronic device; and resuming, using a handler of the first application, an activity of the first application in response to a request from the routing library, wherein the link scheme comprises a scheme providing access to an internal state of the first application.

* * * * *